United States Patent
Sugimoto

(10) Patent No.: US 7,845,333 B2
(45) Date of Patent: Dec. 7, 2010

(54) INTERNAL COMBUSTION ENGINE APPARATUS, VEHICLE AND CONTROL METHOD OF INTERNAL COMBUSTION ENGINE APPARATUS

(75) Inventor: Hitoki Sugimoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 502 days.

(21) Appl. No.: 11/979,412

(22) Filed: Nov. 2, 2007

(65) Prior Publication Data

US 2008/0114525 A1    May 15, 2008

(30) Foreign Application Priority Data

Nov. 10, 2006    (JP)    .............................. 2006-305031

(51) Int. Cl.
F02P 5/00    (2006.01)
(52) U.S. Cl. .................. 123/406.47; 701/103; 701/104; 701/105
(58) Field of Classification Search ............ 123/406.47, 123/406.12, 295, 305, 478; 701/103, 104, 701/105
See application file for complete search history.

(56) References Cited

U.S. PATENT DOCUMENTS

| 7,185,631 | B2 * | 3/2007 | Takeda et al. .......... 123/406.11 |
| 7,317,983 | B2 * | 1/2008 | Ishizuka et al. ............. 701/103 |

FOREIGN PATENT DOCUMENTS

| JP | 63-075355 | 4/1988 |
| JP | 07-180643 | 7/1995 |
| JP | 11-182395 | 7/1999 |
| JP | 2002-004992 A | 1/2002 |
| JP | 2005-307889 | 11/2005 |
| JP | 2006-125245 A | 5/2006 |

* cited by examiner

*Primary Examiner*—Stephen K Cronin
*Assistant Examiner*—J. Page Hufty
(74) *Attorney, Agent, or Firm*—Kenyon & Kenyon LLP

(57) ABSTRACT

When a condition for the prediction of the occurrence transient knocking has held, that is, when a cooling water temperature θw is not less than a threshold value θwref and an intake air flow Qa is not less than a threshold value Qaref and a deviation of the intake air flow ΔQa is not less than a threshold value ΔQaref (S550 to S570), ignition is performed with timing on the delay angle side compared to timing FT1 by a delay angle amount α that tends to decrease as an amount increase coefficient Kf increases (S600 to S680). Because of this, it is possible to suppress the occurrence of knocking without causing the ignition timing to be delayed more than necessary. As a result of this, it is also possible to suppress the worsening of drivability.

13 Claims, 12 Drawing Sheets

INTERNAL COMBUSTION ENGINE APPARATUS, VEHICLE AND CONTROL METHOD OF INTERNAL COMBUSTION ENGINE APPARATUS

BACKGROUND OF THE INVENTION

1. Field of the Invention

The present invention relates to an internal combustion engine apparatus, a vehicle and a control method of the internal combustion engine apparatus.

2. Description of the Related Art

An internal combustion engine apparatus that performs transient delay angle control, which involves delay angle control of ignition timing in order to prevent transient knocking during acceleration, has hitherto been proposed as an internal combustion engine apparatus of this kind (refer to Japanese Patent Laid-Open No. H07-180643, for example). In this apparatus, the transient knocking during an intake air temperature rise is prevented by performing transient delay angle control by use of the amount of transient delay angle that tends to increase as the intake air temperature before acceleration rises.

SUMMARY OF THE INVENTION

As described above, in such an internal combustion engine apparatus, the prevention of transient knocking is considered to be one of the problems. For example, when power is output from an internal combustion engine in order that a vehicle performs rapid acceleration from a state in which the amount of a fuel supplied to the internal combustion engine is reduced, the amount of a fuel supplied to the internal combustion engine is sometimes increased in order to prevent the air-fuel ratio from becoming a lean state. However, even in this case, when there is a possibility that transient knocking occurs, it is desirable to prevent transient knocking more appropriately. As a matter of course, it is desired that driver's requirements be met as much as possible.

The object of an internal combustion engine apparatus, a vehicle and a control method of the internal combustion engine apparatus of the present invention is to suppress the occurrence of knocking and to meet driver's requirements as much as possible.

In the internal combustion engine apparatus, the vehicle and the control method of the internal combustion engine apparatus of the present invention, the following manner is adopted in order to achieve the above-described object.

The present invention is directed to a first internal combustion engine apparatus provided with an internal combustion engine having multiple cylinders, the internal combustion engine apparatus includes: a fuel injection device capable of injecting a fuel for each cylinder of the internal combustion engine; an ignition device capable of ignition for each cylinder of the internal combustion engine; a target fuel injection amount setting device that sets, as a target fuel injection amount, a fuel injection amount based on target power to be output from the internal combustion engine and a prescribed fuel restriction when a fuel amount increasing condition for an increase in the amount of a fuel supplied to the internal combustion engine does not hold, and sets, as the target fuel injection amount, a fuel injection amount that is increased by use of the degree of an amount increase based on a prescribed amount increase restriction with respect to a fuel injection amount based on the target power and the prescribed fuel restriction when the fuel amount increasing condition has held; a fuel injection control device that controls the fuel injection device so that fuel injection is performed on the basis of the set target fuel injection amount; a target ignition timing setting device that sets, as target ignition timing, timing based on a prescribed ignition restriction when a rapid-change condition, under which the operating state of the internal combustion engine comes to a prescribed rapid-change state, does not hold, and sets a delay angle amount on the basis of the degree of an amount increase based on the prescribed amount increase restriction, and sets, as the target ignition timing, timing on the delay angle side by the set delay angle amount compared to the timing based on the prescribed ignition restriction when the rapid-change condition has held; and an ignition control device that controls the ignition device so that ignition is performed with the set target ignition timing.

In the first internal combustion engine apparatus of the present invention, when a fuel amount increasing condition for an increase in the amount of a fuel supplied to the internal combustion engine does not hold, a fuel injection amount based on target power to be output from the internal combustion engine and a prescribed fuel restriction is set as a target fuel injection amount, and the fuel injection device is controlled so that fuel injection is performed on the basis of the set target fuel injection amount. And, when the fuel amount increasing condition has held, a fuel injection amount that is increased by use of the degree of an amount increase based on a prescribed amount increase restriction with respect to a fuel injection amount based on the target power and the prescribed fuel restriction is set as the target fuel injection amount, and the fuel injection device is controlled so that fuel injection is performed on the basis of the set target fuel injection amount. And when a rapid-change condition under which the operating state of the internal combustion engine comes to a prescribed rapid-change state does not hold, timing based on a prescribed ignition restriction is set as target ignition timing, and the ignition device is controlled so that ignition is performed with the set target ignition timing. On the other hand, when the rapid-change condition has held, a delay angle amount is set on the basis of the degree of an amount increase based on the prescribed amount increase restriction, timing on the delay angle side by the delay angle amount compared to the timing based on the prescribed ignition restriction is set as the target ignition timing, and the ignition device is controlled so that ignition is performed with the set target ignition timing. That is, when the rapid-change condition under which the operating state of the internal combustion engine comes to the prescribed rapid-change state has held, ignition is performed with timing on the delay angle side compared to the timing based on the prescribed ignition restriction by a delay angle amount based on the degree of an amount increase. Thereby, it is possible to perform ignition with timing that meets the timing based on the prescribed ignition restriction and the delay angle amount based on the degree of an amount increase. Therefore, if a delay angle amount is appropriately set according to the degree of an amount increase, it is possible to suppress the occurrence of knocking without causing the delay of ignition timing more than necessary. In addition, it is possible to prevent a driving force output from the internal combustion engine from becoming too small because the ignition timing is not delayed more than necessary and, therefore, it is possible to meet driver's requirements more satisfactorily. The "fuel amount increasing condition" includes a condition that holds when there is a possibility that the operating state of the above-described internal combustion engine comes to a lean state. In this case, the above-described fuel amount increasing condition can also be a condition that holds when fuel supply to the above-described internal combustion engine is performed after the continuation of a stop of fuel supply to above-described internal combustion engine for a duration of not less than a prescribed time. The "prescribed rapid-change state" includes an operating state in which knocking may occur in association with a rapid change in the operating state of the above-described internal combustion engine. In this case, the above-described prescribed rapid-change state can also be a state in which the rate of change of the intake air flow of an intake air system of the above-described internal combustion engine is not less than a prescribed rate of change, and it can also be a state in which the intake air flow of an intake air system of the above-described internal combustion engine is not less than a prescribed air flow and the rate of change of the above-described intake air flow is not less than a prescribed rate of change and the temperature of the internal combustion engine is not less than a prescribed temperature. Furthermore, the "prescribed fuel restriction" and the "prescribed ignition restriction" can also be restrictions for operating the internal combustion engine with good efficiency. The "prescribed amount increase restriction" can also be a restriction with a tendency for the degree of an amount increase to decrease over time.

In the first internal combustion engine apparatus of the present invention, when the rapid-change condition has held, the target ignition timing setting device may be a device that sets the delay angle amount to ensure a tendency for the delay angle amount to decrease in proportion as the degree of an amount increase based on the prescribed amount increase restriction increases. This is based on the reason why the occurrence of knocking can be suppressed even if the ignition timing is not delayed so much in the case of a large degree of the amount increase of a fuel when the rapid-change condition has held, because the larger the degree of the amount increase of a fuel supplied to an internal combustion engine, the less the operating state of the internal combustion engine come to a lean state. And when the rapid-change condition has held at a relatively large degree of the amount increase of a fuel, it is possible to prevent a driving force output from the internal combustion engine from decreasing by reducing a delay angle amount and it is possible to meet driver's requirements more satisfactorily. In this case, when the rapid-change condition has held, the target ignition timing setting device may be a device that sets the delay angle amount within a range of a limit to a delay angle amount that is set to ensure the tendency for the delay angle amount to decrease in proportion as the degree of an amount increase based on the prescribed amount increase restriction increases.

In the first internal combustion engine apparatus of the invention, in addition, when the rapid-change condition has held and in a case where the degree of an amount increase based on the prescribed amount increase restriction is larger than the degree of a prescribed amount increase, the target ignition timing setting device may be a device that sets, as the target ignition timing, timing based on the prescribed ignition restriction regardless of whether the rapid-change condition holds Furthermore, when the rapid-change condition has held, the target ignition timing setting device may be a device that sets the delay angle amount so that the degree of an amount increase becomes smaller than when the degree of an amount increase is not more than the degree of the prescribed amount increase in a case where the degree of an amount increase based on the prescribed amount increase restriction is larger than the degree of a second prescribed amount increase. These are based on the reason why the occurrence of knocking can be suppressed even if the ignition timing is not delayed so much in the case of a large degree of the amount increase of a fuel supplied to the internal combustion when the rapid-change condition has held. And when the rapid-change condition has held at a relatively large degree of the amount increase of the fuel, it is possible to prevent a driving force output from the internal combustion engine from decreasing by not delaying the ignition timing or by reducing a delay angle amount and it is possible to meet driver's requirements more satisfactorily. In the latter case, when the rapid-change condition has held, the target ignition timing setting device may be a device that sets the delay angle amount within a range of a limit to a delay angle amount that is set to be smaller than when the degree of an amount increase is not more than the degree of the prescribed amount increase in a case where the degree of an amount increase based on the prescribed amount increase restriction is larger than the degree of the second prescribed amount increase.

Additionally, in the first internal combustion engine apparatus of the present invention, when the rapid-change condition has held, the target ignition timing setting device may be a device that sets the target ignition timing so that the target ignition timing is approached from timing on the delay angle side compared to the timing based on the prescribed ignition restriction toward timing based on the prescribed ignition restriction.

The present invention is directed to a second internal combustion engine apparatus provided with an internal combustion engine having multiple cylinders, the internal combustion engine apparatus includes: a fuel injection device capable of injecting a fuel for each cylinder of the internal combustion engine; an ignition device capable of ignition for each cylinder of the internal combustion engine; an amount-increase instruction providing device that provides instructions so that when a fuel amount increasing condition for an increase in the amount of a fuel supplied to the internal combustion engine has held, the amount of the fuel is to be increased compared to a case where the fuel amount increasing condition does not hold; a fuel injection control device that controls the fuel injection device so that fuel injection is performed on the basis of target power to be output from the internal combustion engine and amount-increase instructions provided by the amount-increase instruction providing device; a target ignition timing setting device that when a rapid-change condition under which the operating state of the internal combustion engine comes to a prescribed rapid-change state has held, sets, as the target ignition timing, timing on the delay angle side by a prescribed delay angle amount compared to the timing based on a prescribed ignition restriction when amount-increase instructions by the amount-increase instruction providing device have not been provided, and sets, as the target ignition timing, timing based on the prescribed ignition restriction when amount-increase instructions by the amount-increase instruction providing device have been provided; and an ignition control device that controls the ignition device so that ignition is performed with the set target ignition timing.

In the second internal combustion engine apparatus of the present invention, when a fuel amount increasing condition for an increase in the amount of a fuel supplied to the internal combustion engine has held, instructions are provided so that the amount of the fuel is to be increased compared to a case where the fuel amount increasing condition does not hold and the fuel injection device is controlled so that fuel injection is performed on the basis of target power to be output from the internal combustion engine and the amount-increase instructions provided by the amount-increase instruction providing device. And when a rapid-change condition under which the operating state of the internal combustion engine comes to a prescribed rapid-change state has held and when the amount-increase instructions by the amount-increase instruction providing device have not been provided, timing on the delay angle side by a prescribed delay angle amount compared to the timing based on a prescribed ignition restriction is set as the target ignition timing, and the ignition device is controlled so that ignition is performed with the set target ignition timing. On the other hand, when the rapid-change condition has held and when the amount-increase instructions by the amount-increase instruction providing device have been provided, timing based on the prescribed ignition restriction is set as the target ignition timing, and the ignition device is controlled so that ignition is performed with the set target ignition timing. That is, when the rapid-change condition under which the operating state of the internal combustion engine comes to the prescribed rapid-change state has held, ignition is performed with timing on the delay angle side compared to the timing based on the prescribed ignition restriction when the amount-increase instructions have not been provided, and ignition is performed at the timing based on the prescribed ignition restriction when the amount-increase instructions have been provided. Thereby, it is possible to suppress the occurrence of knocking when the amount-increase instructions have not been provided. When the amount-increase instructions have been provided, it is possible to prevent a driving force output from the internal combustion engine from decreasing. When an amount increase of a fuel is performed, the operating state of the internal combustion engine is less apt to come to a lean state than when an amount increase is not performed, and it can be thought, therefore, that in this case the possibility of the occurrence of knocking is low. The "fuel amount increasing condition" includes a condition that holds when there is a possibility that the operating state of the above-described internal combustion engine comes to a lean state. In this case, the above-described fuel amount increasing condition can also be a condition that holds when fuel supply to the above-described internal combustion engine is performed after the continuation of a stop of fuel supply to above-described internal combustion engine for a duration of not less than a prescribed time. The "prescribed rapid-change state" includes an operating state in which knocking may occur in association with a rapid change in the operating state of the above-described internal combustion engine. In this case, the above-described prescribed rapid-change state can also be a state in which the rate of change of the intake air flow of an intake air system of the above-described internal combustion engine is not less than a prescribed rate of change, and it can also be a state in which the intake air flow of an intake air system of the above-described internal combustion engine is not less than a prescribed air flow and the rate of change of the above-described intake air flow is not less than a prescribed rate of change and the temperature of the internal combustion engine is not less than a prescribed temperature. Furthermore, the "prescribed fuel restriction" and the "prescribed ignition restriction" can also be restrictions for operating the internal combustion engine with good efficiency. The "prescribed amount increase restriction" can also be a restriction with a tendency for the degree of an amount increase to decrease over time.

In the second internal combustion engine apparatus of the present invention, when the rapid-change condition has held, the target ignition timing setting device may be a device that sets the target ignition timing so that the target ignition timing is approached from timing on the delay angle side compared to the timing based on the prescribed ignition restriction toward timing based on the prescribed ignition restriction.

The present invention is directed to a first vehicle including: an internal combustion engine; a fuel injection device capable of injecting a fuel for each cylinder of the internal combustion engine; an ignition device capable of ignition for each cylinder of the internal combustion engine; a rotation adjusting device that is connected to an output shaft of the internal combustion engine and to a drive shaft connected to an axle so as to be rotatable independently of the output shaft and can adjust a rotation speed of the output shaft with respect to the drive shaft, with input and output of electric power and input and output of a drive force to and from the output shaft and the drive shaft; an electric motor capable of input and output of power to and from the drive shaft; a target fuel injection amount setting device that sets, as a target fuel injection amount, a fuel injection amount based on target power to be output from the internal combustion engine and a prescribed fuel restriction when a fuel amount increasing condition for an increase in the amount of a fuel supplied to the internal combustion engine does not hold, and sets, as the target fuel injection amount, a fuel injection amount that is increased by use of the degree of an amount increase based on a prescribed amount increase restriction with respect to a fuel injection amount based on the target power and the prescribed fuel restriction when the fuel amount increasing condition has held; a fuel injection control device that controls the fuel injection device so that fuel injection is performed on the basis of the set target fuel injection amount; a target ignition timing setting device that sets, as target ignition timing, timing based on a prescribed ignition restriction when a rapid-change condition, under which the operating state of the internal combustion engine comes to a prescribed rapid-change state, does not hold, and sets a delay angle amount on the basis of the degree of an amount increase based on the prescribed amount increase restriction, and sets, as the target ignition timing, timing on the delay angle side by the set delay angle amount compared to the timing based on the prescribed ignition restriction when the rapid-change condition has held; and an ignition control device that controls the ignition device so that ignition is performed with the set target ignition timing.

In the first vehicle of the present invention, when a fuel amount increasing condition for an increase in the amount of a fuel supplied to the internal combustion engine does not hold, a fuel injection amount based on target power to be output from the internal combustion engine and a prescribed fuel restriction is set as a target fuel injection amount, and the fuel injection device is controlled so that fuel injection is performed on the basis of the set target fuel injection amount. And, when the fuel amount increasing condition has held, a fuel injection amount that is increased by use of the degree of an amount increase based on a prescribed amount increase restriction with respect to a fuel injection amount based on the target power and the prescribed fuel restriction is set as the target fuel injection amount, and the fuel injection device is controlled so that fuel injection is performed on the basis of the set target fuel injection amount. And when a rapid-change condition under which the operating state of the internal combustion engine comes to a prescribed rapid-change state does not hold, timing based on a prescribed ignition restriction is set as target ignition timing, and the ignition device is controlled so that ignition is performed with the set target ignition timing. On the other hand, when the rapid-change condition has held, a delay angle amount is set on the basis of the degree of an amount increase based on the prescribed amount increase restriction, timing on the delay angle side by the set delay angle amount compared to the timing based on the prescribed ignition restriction is set as the target ignition timing, and the ignition device is controlled so that ignition is performed with the set target ignition timing. That is, when the rapid-change condition under which the operating state of the internal combustion engine comes to the prescribed rapid-change state has held, ignition is performed with timing on the delay angle side compared to the timing based on the prescribed ignition restriction by a delay angle amount based on the degree of an amount increase. Thereby, it is possible to perform ignition with timing that meets the timing based on the prescribed ignition restriction and the delay angle amount based on the degree of an amount increase. Therefore, if a delay angle amount is appropriately set according to the degree of an amount increase, it is possible to suppress the occurrence of knocking without causing the delay of ignition timing more than necessary. In addition, it is possible to prevent a driving force output from the internal combustion engine from becoming too small because the ignition timing is not delayed more than necessary and, therefore, it is possible to meet driver's requirements more satisfactorily. The "fuel amount increasing condition" includes a condition that holds when there is a possibility that the operating state of the above-described internal combustion engine comes to a lean state. In this case, the above-described fuel amount increasing condition can also be a condition that holds when fuel supply to the above-described internal combustion engine is performed after the continuation of a stop of fuel supply to the above-described internal combustion engine for a duration of not less than a prescribed time. The "prescribed rapid-change state" includes an operating state in which knocking may occur in association with a rapid change in the operating state of the above-described internal combustion engine. In this case, the above-described prescribed rapid-change state can also be a state in which the rate of change of the intake air flow of an intake air system of the above-described internal combustion engine is not less than a prescribed rate of change, and it can also be a state in which the intake air flow of an intake air system of the above-described internal combustion engine is not less than a prescribed air flow and the rate of change of the above-described intake air flow is not less than a prescribed rate of change and the temperature of the internal combustion engine is not less than a prescribed temperature. Furthermore, the "prescribed fuel restriction" and the "prescribed ignition restriction" can also be restrictions for operating the internal combustion engine with good efficiency. The "prescribed amount increase restriction" can also be a restriction with a tendency for the degree of an amount increase to decrease over time.

In the first vehicle of the present invention, the above-described rotation adjusting device can also be a mechanism that is provided with a three-shaft type power input output module, which is connected to the three shafts of the output shaft of the above-described internal combustion engine, the above-described power output shaft and a third shaft, and inputs and outputs power to and from two of the three shafts on the basis of the power input and output to the remaining one shaft, and a generator capable of inputting and outputting power to and from the above-described third shaft.

The present invention is directed to a second vehicle including: an internal combustion engine; a fuel injection device capable of injecting a fuel for each cylinder of the internal combustion engine; an ignition device capable of ignition for each cylinder of the internal combustion engine; a rotation adjusting device that is connected to an output shaft of the internal combustion engine and to a drive shaft connected to an axle so as to be rotatable independently of the output shaft and can adjust a rotation speed of the output shaft with respect to the drive shaft, with input and output of electric power and input and output of a drive force to and from the output shaft and the drive shaft; an electric motor capable of input and output of power to and from the drive shaft; an amount-increase instruction providing device that provides instructions so that when a fuel amount increasing condition for an increase in the amount of a fuel supplied to the internal combustion engine has held, the amount of the fuel is to be increased compared to a case where the fuel amount increasing condition does not hold; a fuel injection control device that controls the fuel injection device so that fuel injection is performed on the basis of target power to be output from the internal combustion engine and amount-increase instructions provided by the amount-increase instruction providing device; a target ignition timing setting device that when a rapid-change condition under which the operating state of the internal combustion engine comes to a prescribed rapid-change state has held, sets, as the target ignition timing, timing on the delay angle side by a prescribed delay angle amount compared to the timing based on a prescribed ignition restriction when amount-increase instructions by the amount-increase instruction providing device have not been provided, and sets, as the target ignition timing, timing based on the prescribed ignition restriction when amount-increase instructions by the amount-increase instruction providing device have been provided; and an ignition control device that controls the ignition device so that ignition is performed with the set target ignition timing.

In the second vehicle of the present invention, when a fuel amount increasing condition for an increase in the amount of a fuel supplied to the internal combustion engine has held, instructions are provided so that the amount of the fuel is to be increased compared to a case where the fuel amount increasing condition does not hold and the fuel injection device is controlled so that fuel injection is performed on the basis of target power to be output from the internal combustion engine and the amount-increase instructions provided by the amount-increase instruction providing device. And when a rapid-change condition under which the operating state of the internal combustion engine comes to a prescribed rapid-change state has held and when the amount-increase instructions by the amount-increase instruction providing device have not been provided, timing on the delay angle side by a prescribed delay angle amount compared to the timing based on a prescribed ignition restriction is set as the target ignition timing, and the ignition device is controlled so that ignition is performed with the set target ignition timing. On the other hand, when the rapid-change condition has held and when the amount-increase instructions by the amount-increase instruction providing device have been provided, timing based on the prescribed ignition restriction is set as the target ignition timing, and the ignition device is controlled so that ignition is performed with the set target ignition timing. That is, when the rapid-change condition under which the operating state of the internal combustion engine comes to the prescribed rapid-change state has held, ignition is performed with timing on the delay angle side compared to the timing based on the prescribed ignition restriction when the amount-increase instructions have not been provided, and ignition is performed at the timing based on the prescribed ignition restriction when the amount-increase instructions have been provided. Thereby, it is possible to suppress the occurrence of knocking when the amount-increase instructions have not been provided. When the amount-increase instructions have been provided, it is possible to prevent a driving force output from the internal combustion engine from decreasing. When an amount increase of a fuel is performed, the operating state of the internal combustion engine is less apt to come to a lean state than when an amount increase is not performed, and it can be thought, therefore, that in this case the possibility of the occurrence of knocking is low. The "fuel amount increasing condition" includes a condition that holds when there is a possibility that the operating state of the above-described internal combustion engine comes to a lean state. In this case, the above-described fuel amount increasing condition can also be a condition that holds when fuel supply to the above-described internal combustion engine is performed after the continuation of a stop of fuel supply to the above-described internal combustion engine for a duration of not less than a prescribed time. The "prescribed rapid-change state" includes an operating state in which knocking may occur in association with a rapid change in the operating state of the above-described internal combustion engine. In this case, the above-described prescribed rapid-change state can also be a state in which the rate of change of the intake air flow of an intake air system of the above-described internal combustion engine is not less than a prescribed rate of change, and it can also be a state in which the intake air flow of an intake air system of the above-described internal combustion engine is not less than a prescribed air flow and the rate of change of the above-described intake air flow is not less than a prescribed rate of change and the temperature of the internal combustion engine is not less than a prescribed temperature. Furthermore, the "prescribed fuel restriction" and the "prescribed ignition restriction" can also be restrictions for operating the internal combustion engine with good efficiency. The "prescribed amount increase restriction" can also be a restriction with a tendency for the degree of an amount increase to decrease over time.

In the second vehicle of the present invention, the above-described rotation adjusting device can also be a mechanism that is provided with a three-shaft type power input output module, which is connected to the three shafts of the output shaft of the above-described internal combustion engine, the above-described power output shaft and a third shaft, and inputs and outputs power to and from two of the three shafts on the basis of the power input and output to the remaining one shaft, and a generator capable of inputting and outputting power to and from the above-described third shaft.

The present invention is directed to a control method of the first internal combustion engine apparatus of the present invention which is a control method of an internal combustion engine apparatus provided with a fuel injection device capable of injecting a fuel for each cylinder of the internal combustion engine, and an ignition device capable of ignition for each cylinder of the internal combustion engine. The control method of an internal combustion engine apparatus includes: setting, as a target fuel injection amount, a fuel injection amount based on target power to be output from the internal combustion engine and a prescribed fuel restriction and controlling the fuel injection device so that fuel injection is performed on the basis of the set target fuel injection amount when a fuel amount increasing condition for an increase in the amount of a fuel supplied to the internal combustion engine does not hold, while, setting, as the target fuel injection amount, a fuel injection amount that is increased by use of the degree of an amount increase based on a prescribed amount increase restriction with respect to a fuel injection amount based on the target power and the prescribed fuel restriction and controlling the fuel injection device so that fuel injection is performed on the basis of the set target fuel injection amount when the fuel amount increasing condition has held; and setting, as target ignition timing, timing based on a prescribed ignition restriction and, controlling the ignition device so that ignition is performed with the set target ignition timing when a rapid-change condition under which the operating state of the internal combustion engine comes to a prescribed rapid-change state does not hold, while, setting a delay angle amount on the basis of the degree of an amount increase based on the prescribed amount increase restriction, and setting, as the target ignition timing, timing on the delay angle side by the set delay angle amount compared to the timing based on the prescribed ignition restriction and controlling the ignition device so that ignition is performed with the set target ignition timing when the rapid-change condition has held.

In the control method of the first internal combustion engine apparatus of the present invention, when a fuel amount increasing condition for an increase in the amount of a fuel supplied to the internal combustion engine does not hold, a fuel injection amount based on target power to be output from the internal combustion engine and a prescribed fuel restriction is set as a target fuel injection amount, and the fuel injection device is controlled so that fuel injection is performed on the basis of the set target fuel injection amount. And, when the fuel amount increasing condition has held, a fuel injection amount that is increased by use of the degree of an amount increase based on a prescribed amount increase restriction with respect to a fuel injection amount based on the target power and the prescribed fuel restriction is set as the target fuel injection amount, and the fuel injection device is controlled so that fuel injection is performed on the basis of the set target fuel injection amount. And when a rapid-change condition under which the operating state of the internal combustion engine comes to a prescribed rapid-change state does not hold, timing based on a prescribed ignition restriction is set as target ignition timing, and the ignition device is controlled so that ignition is performed with the set target ignition timing. On the other hand, when the rapid-change condition has held, a delay angle amount is set on the basis of the degree of an amount increase based on the prescribed amount increase restriction, timing on the delay angle side by the delay angle amount compared to the timing based on the prescribed ignition restriction is set as the target ignition timing, and the ignition device is controlled so that ignition is performed with the set target ignition timing. That is, when the rapid-change condition under which the operating state of the internal combustion engine comes to the prescribed rapid-change state has held, ignition is performed with timing on the delay angle side compared to the timing based on the prescribed ignition restriction by a delay angle amount based on the degree of an amount increase. Thereby, it is possible to perform ignition with timing that meets the timing based on the prescribed ignition restriction and the delay angle amount based on the degree of an amount increase. Therefore, if a delay angle amount is appropriately set according to the degree of an amount increase, it is possible to suppress the occurrence of knocking without causing the delay of ignition timing more than necessary. In addition, it is possible to prevent a driving force output from the internal combustion engine from becoming too small because the ignition timing is not delayed more than necessary and, therefore, it is possible to meet driver's requirements more satisfactorily. The "fuel amount increasing condition" includes a condition that holds when there is a possibility that the operating state of the above-described internal combustion engine comes to a lean state. In this case, the above-described fuel amount increasing condition can also be a condition that holds when fuel supply to the above-described internal combustion engine is performed after the continuation of a stop of fuel supply to the above-described internal combustion engine for a duration of not less than a prescribed time. The "prescribed rapid-change state" includes an operating state in which knocking may occur in association with a rapid change in the operating state of the above-described internal combustion engine. In this case, the above-described prescribed rapid-change state can also be a state in which the rate of change of the intake air flow of an intake air system of the above-described internal combustion engine is not less than a prescribed rate of change, and it can also be a state in which the intake air flow of an intake air system of the above-described internal combustion engine is not less than a prescribed air flow and the rate of change of the above-described intake air flow is not less than a prescribed rate of change and the temperature of the internal combustion engine is not less than a prescribed temperature. Furthermore, the "prescribed fuel restriction" and the "prescribed ignition restriction" can also be restrictions for operating the internal combustion engine with good efficiency. The "prescribed amount increase restriction" can also be a restriction with a tendency for the degree of an amount increase to decrease over time.

The present invention is directed to a control method of the second internal combustion engine apparatus of the present invention which is a control method of an internal combustion engine apparatus provided with a fuel injection device capable of injecting a fuel for each cylinder of the internal combustion engine, and an ignition device capable of ignition for each cylinder of the internal combustion engine. The control method of an internal combustion engine apparatus includes: providing instructions so that the amount of the fuel is to be increased compared to a case where a fuel amount increasing condition does not hold when the fuel amount increasing condition for an increase in the amount of a fuel supplied to the internal combustion engine has held; controlling the fuel injection device so that fuel injection is performed on the basis of target power to be output from the internal combustion engine and the amount-increase instructions; and when a rapid-change condition under which the operating state of the internal combustion engine comes to a prescribed rapid-change state has held, setting, as the target ignition timing, timing on the delay angle side by a prescribed delay angle amount compared to the timing based on a prescribed ignition restriction and controlling the ignition device so that ignition is performed with the set target ignition timing when amount-increase instructions by the amount-increase instruction providing device have not been provided, while, setting, as the target ignition timing, timing based on the prescribed ignition restriction and controlling the ignition device so that ignition is performed with the set target ignition timing when amount-increase instructions by the amount-increase instruction providing device have been provided.

In the control method of the second internal combustion engine apparatus of the present invention, when a fuel amount increasing condition for an increase in the amount of a fuel supplied to the internal combustion engine has held, instructions are provided so that the amount of the fuel is to be increased compared to a case where the fuel amount increasing condition does not hold and the fuel injection device is controlled so that fuel injection is performed on the basis of target power to be output from the internal combustion engine and the amount-increase instructions provided by the amount-increase instruction providing device. And when a rapid-change condition under which the operating state of the internal combustion engine comes to a prescribed rapid-change state has held and when the amount-increase instructions by the amount-increase instruction providing device have not been provided, timing on the delay angle side by a prescribed delay angle amount compared to the timing based on a prescribed ignition restriction is set as the target ignition timing, and the ignition device is controlled so that ignition is performed with the set target ignition timing. On the other hand, when the rapid-change condition has held and when the amount-increase instructions by the amount-increase instruction providing device have been provided, timing based on the prescribed ignition restriction is set as the target ignition timing, and the ignition device is controlled so that ignition is performed with the set target ignition timing. That is, when the rapid-change condition under which the operating state of the internal combustion engine comes to the prescribed rapid-change state has held, ignition is performed with timing on the delay angle side compared to the timing based on the prescribed ignition restriction when the amount-increase instructions have not been provided, and ignition is performed at the timing based on the prescribed ignition restriction when the amount-increase instructions have been provided. Thereby, it is possible to suppress the occurrence of knocking when the amount-increase instructions have not been provided. When the amount-increase instructions have been provided, it is possible to prevent a driving force output from the internal combustion engine from decreasing. When an amount increase of a fuel is performed, the operating state of the internal combustion engine is less apt to come to a lean state than when an amount increase is not performed, and it can be thought, therefore, that in this case the possibility of the occurrence of knocking is low. The "fuel amount increasing condition" includes a condition that holds when there is a possibility that the operating state of the above-described internal combustion engine comes to a lean state. In this case, the above-described fuel amount increasing condition can also be a condition that holds when fuel supply to the above-described internal combustion engine is performed after the continuation of a stop of fuel supply to the above-described internal combustion engine for a duration of not less than a prescribed time. The "prescribed rapid-change state" includes an operating state in which knocking may occur in association with a rapid change in the operating state of the above-described internal combustion engine. In this case, the above-described prescribed rapid-change state can also be a state in which the rate of change of the intake air flow of an intake air system of the above-described internal combustion engine is not less than a prescribed rate of change, and it can also be a state in which the intake air flow of an intake air system of the above-described internal combustion engine is not less than a prescribed air flow and the rate of change of the above-described intake air flow is not less than a prescribed rate of change and the temperature of the internal combustion engine is not less than a prescribed temperature. Furthermore, the "prescribed fuel restriction" and the "prescribed ignition restriction" can also be restrictions for operating the internal combustion engine with good efficiency. The "prescribed amount increase restriction" can also be a restriction with a tendency for the degree of an amount increase to decrease over time.

DESCRIPTION OF THE PREFERRED EMBODIMENTS

Figure 1:
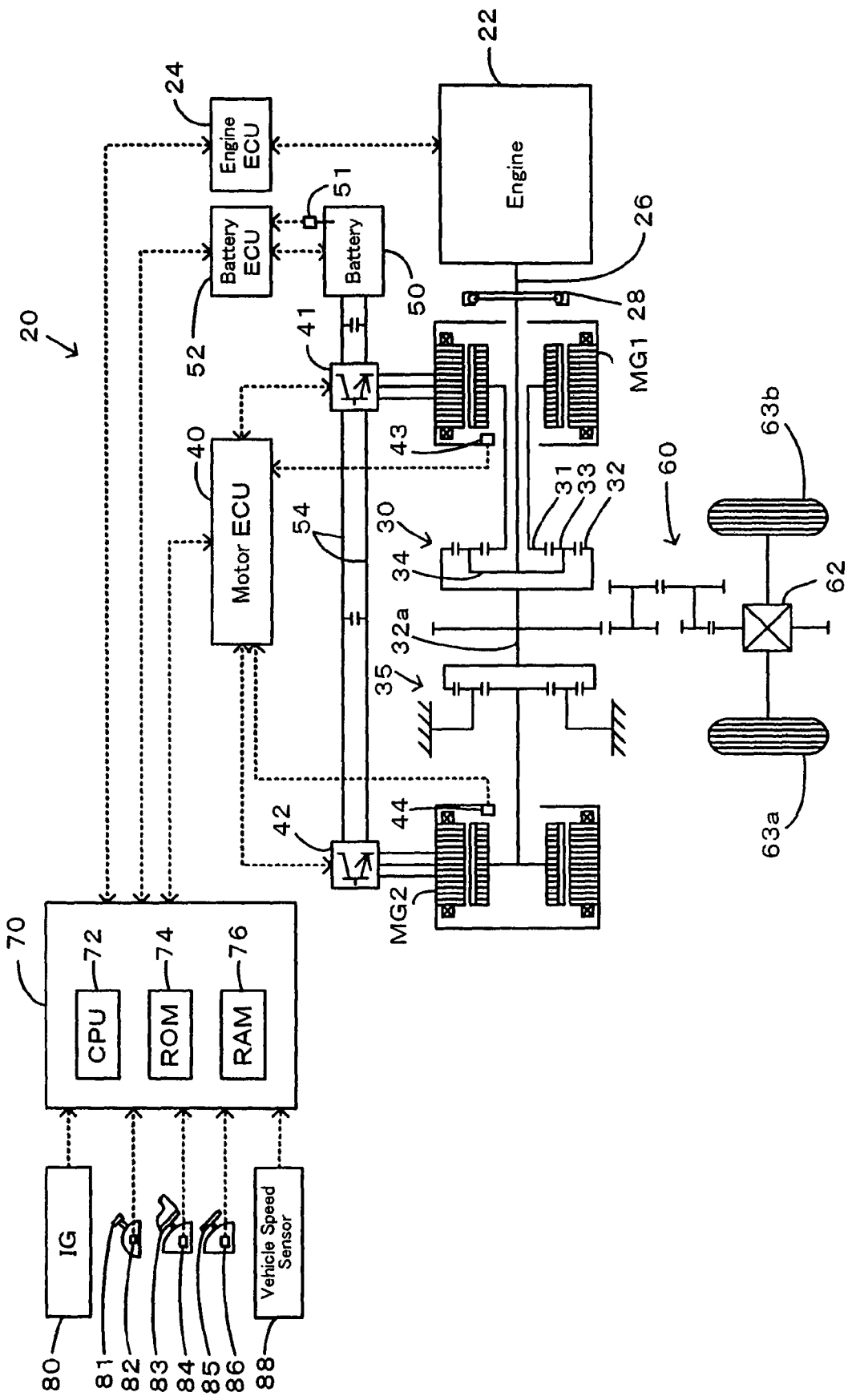
FIG. 1 is a block diagram showing a general configuration of a hybrid vehicle 20, in which a power output apparatus provided with an internal combustion engine apparatus as an embodiment of the present invention is mounted.

One mode of carrying out the invention is discussed below as a preferred embodiment. FIG. 1 schematically illustrates the construction of a hybrid vehicle 20 with a power output apparatus equipped with an internal combustion engine apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

Figure 2:
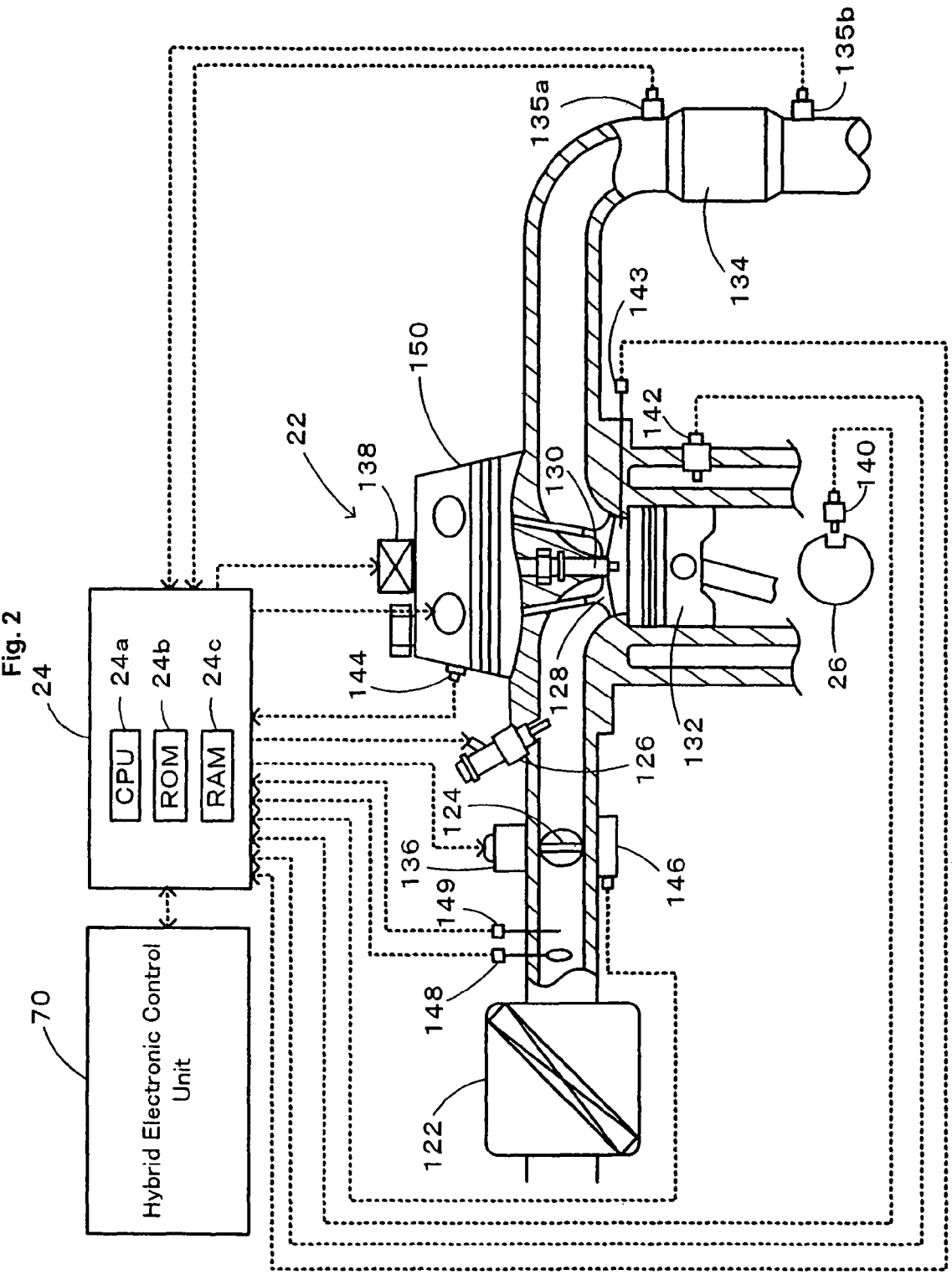
FIG. 2 is a block diagram showing a general configuration of an engine 22.

The engine 22 is an internal combustion engine having multiple cylinders (for example, six-cylinder) that consumes a hydrocarbon fuel, such as gasoline or light oil, to output power. As shown in FIG. 2, the air cleaned by an air cleaner 122 and taken in via a throttle valve 124 is mixed with the atomized gasoline injected by a fuel injection valve 126 to the air-fuel mixture. The air-fuel mixture is introduced into a combustion chamber via an intake valve 128. The introduced air-fuel mixture is ignited with spark made by a spark plug 130 to be explosively combusted. The reciprocating motions of a piston 132 by the combustion energy are converted into rotational motions of a crankshaft 23. The exhaust from the engine 22 goes through a catalytic conversion unit 134 (filled with three-way catalyst) to convert toxic components included in the exhaust, that is, carbon monoxide (CO), hydrocarbons (HC), and nitrogen oxides (NOx), into harmless components, and is discharged to the outside air.

The engine 22 is under control of an engine electronic control unit 24 (hereafter referred to as engine ECU). The engine ECU 24 is constructed as a microprocessor including a CPU 24a, a ROM 24b that stores processing programs, a RAM 24c that temporarily stores data, input and output ports (not shown), and a communication port (not shown). The engine ECU 24 receives, via its input port (not shown), signals from various sensors that measure and detect the conditions of the engine 22. The signals input into the engine ECU 24 include a crank position from a crank position sensor 140 detected as the rotational position of the crankshaft 23, a cooling water temperature (θw) from a water temperature sensor 142 measured as the temperature of cooling water in the engine 22, an in-cylinder pressure Pin from a pressure sensor 143 located inside the combustion chamber, a cam position from a cam position sensor 144 detected as the rotational position of a camshaft driven to open and close the intake valve 128 and an exhaust valve for gas intake and exhaust into and from the combustion chamber, a throttle valve position from a throttle valve position sensor 146 detected as the opening or position of the throttle valve 124, an amount of intake air Qa from an air flow meter 148 that detects mass flow rate of the amount of intake air attached to an air intake conduit, an intake air temperature from a temperature sensor 149 attached to the air intake conduit, an air-fuel ratio AF from an air-fuel ratio sensor 135a and an oxygen signal from an oxygen sensor 135b. The engine ECU 24 outputs, via its output port (not shown), diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 24 communicates with the hybrid electronic control unit 70. The engine ECU 24 receives control signals from the hybrid electronic control unit 70 to drive and control the engine 22, while outputting data regarding the driving conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
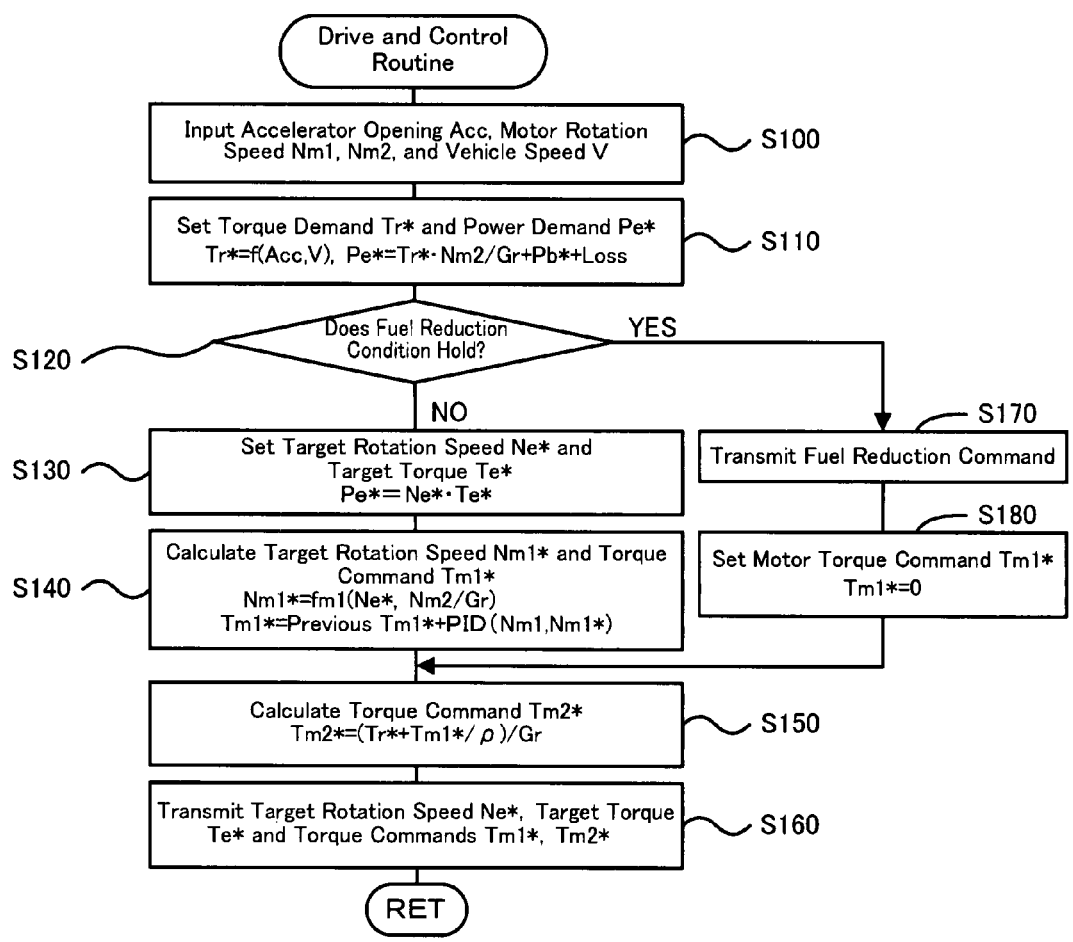
FIG. 3 is a flow chart showing an example of a drive and control routine executed by a hybrid electronic control unit 70 of the embodiment.

Next, the operation of the hybrid vehicle 20 of the embodiment constructed as described above will be described. FIG. 3 is a flowchart showing an example of a drive and control routine executed by the hybrid electronic control unit 70. This routine is repeatedly executed at prescribed intervals (for example, every several milliseconds).

At the start of the execution of the drive and control routine, the CPU 72 of the hybrid electronic control unit 70 first executes the processing for inputting data necessary for control, such as an accelerator opening Acc from the accelerator-pedal position sensor 84, a vehicle speed V from the vehicle-speed sensor 88, a rotation speed Ne of the engine 22, and rotation speeds Nm1, Nm2 of the motors MG1, MG2 (step S100). In this connection, as the rotation speeds Nm1, Nm2 of the motors MG1, MG2, rotation speeds calculated on the basis of the rotation positions of the rotors of the motors MG1, MG2 that are detected by the rotational position detection sensors 43, 44 are input from the motor ECU 40 by use of communication.

Figure 4:
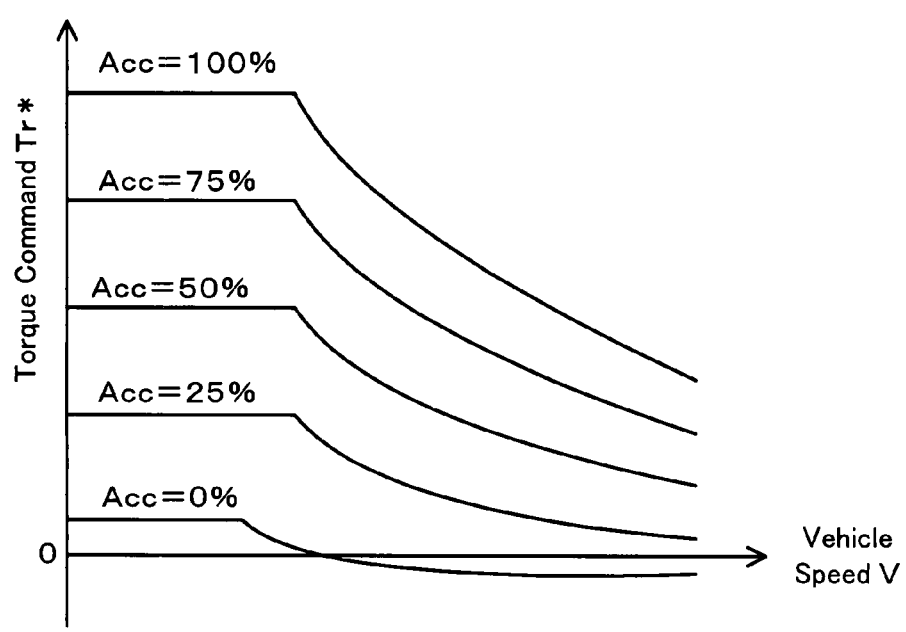
FIG. 4 is an explanatory diagram showing an example of a torque demand setting map.

When the data has been input like this, a torque demand Tr* to be output to the ring gear shaft 32a as the drive shaft connected to the drive wheels 63a, 63b and a power demand Pe* required by the engine 22 are set on the basis of the input accelerator opening Acc and vehicle speed V (step S110) For the torque demand Tr* in this embodiment, the relationship among the accelerator opening Acc, the vehicle speed V and the torque demand Tr* is determined beforehand and stored in the ROM 74 as a torque demand setting map, and when the accelerator opening Acc and the vehicle speed V are given, a corresponding torque demand Tr* is derived from the stored map and set FIG. 4 shows an example of the torque demand setting map. The power demand Pe* can be calculated as a sum of the set torque demand Tr* multiplied by a rotation speed Nr of the ring gear shaft 32a, a charge-discharge power demand Pb* required by the battery 50, and a loss Loss. A rotation speed Nr of the ring gear shaft 32a can be determined by multiplying the vehicle speed V by a conversion coefficient or by dividing the rotation speed Nm2 of the motor MG2 by a gear ratio Gr of the reduction gear 35.

Subsequently, a judgment is made as to whether or not a fuel reduction condition holds (step S120). The fuel reduction condition can be a condition that holds, for example, when the accelerator opening Acc is approximately 0 and the vehicle speed V is in a high vehicle speed range that is determined beforehand. For example, a case where the accelerator pedal 83 is pressed for acceleration and thereafter the accelerator pedal 83 is released during a high-speed travel is considered to be a time when the fuel reduction condition holds.

Figure 5:
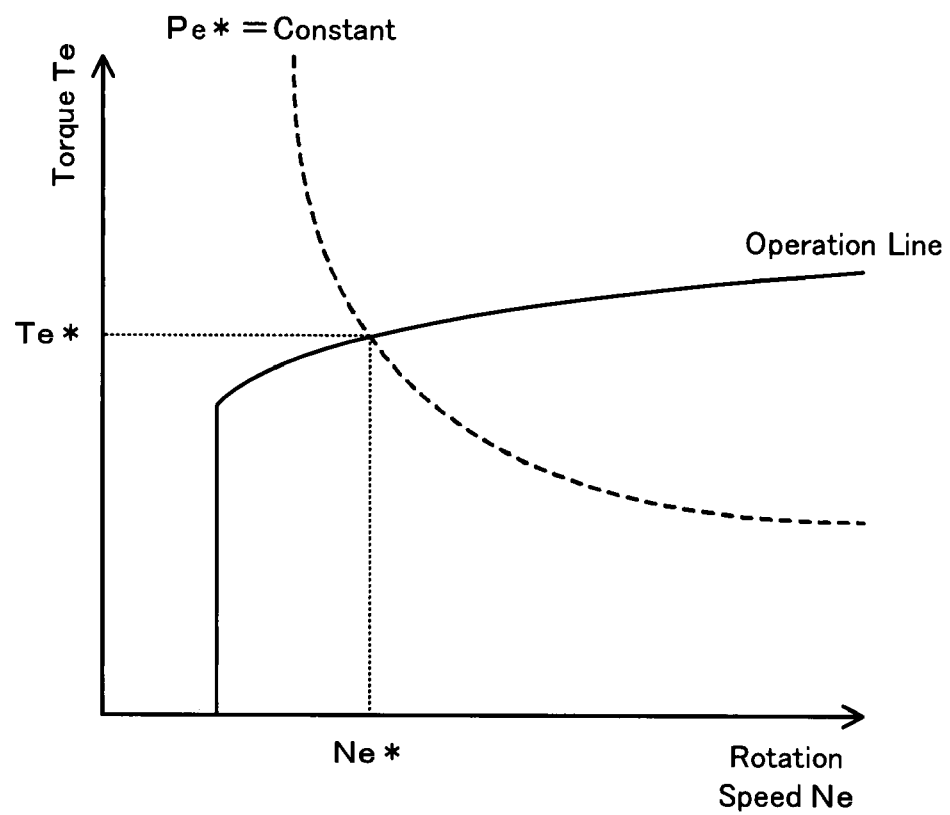
FIG. 5 is an explanatory diagram showing an example of an operation line of the engine 22 and how a target rotation speed Ne* and a target torque Te* are set.

When it has been judged that the fuel reduction condition does not hold, a target rotation speed Ne* and a target torque Te* of the engine 22 are set on the basis of the power demand Pe* (step S130). This setting is performed on the basis of an operation line on which the engine 22 is caused to operate with good efficiency and the power demand Pe*. FIG. 5 shows an example of the operation line of the engine 22 and how the target rotation speed Ne* and the target torque Te* are set. As shown in the drawing, the target rotation speed Ne* and the target torque Te* can be determined by the point of intersection of the operation line and a curve with a constant power demand Pe* (Ne*×Te*).

Figure 6:
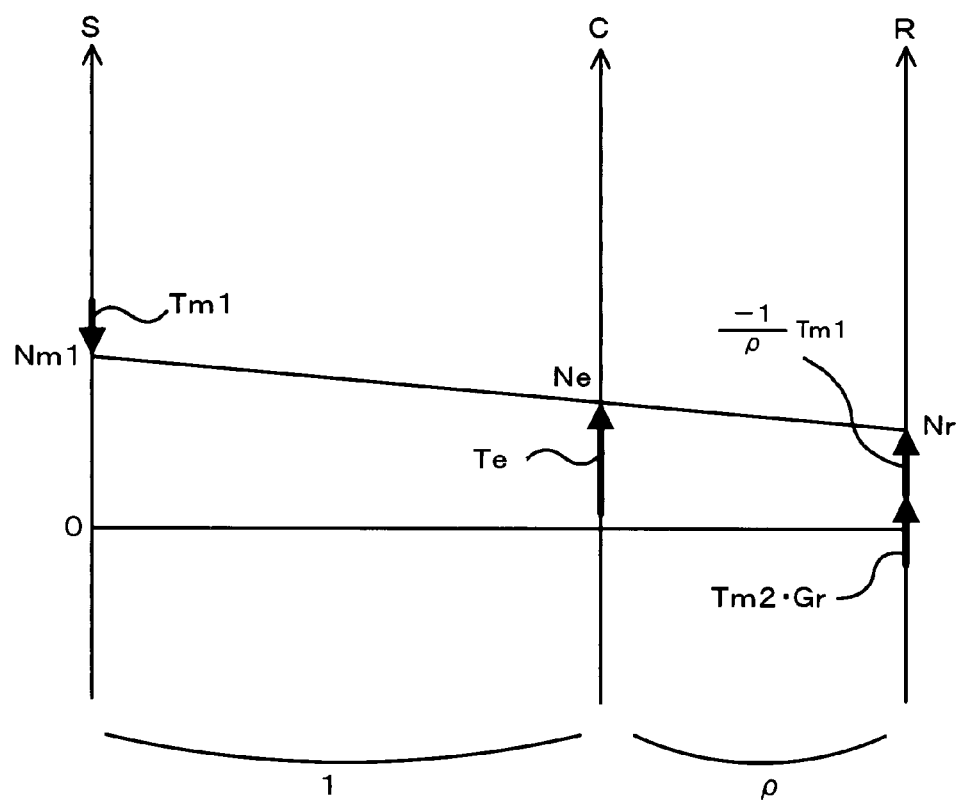
FIG. 6 is an explanatory diagram showing an example of an alignment chart to mechanically explain rotating elements of a power distribution and integration mechanism 30.

Next, a target rotation speed Nm1* of the motor MG1 is calculated by the following equation (1) by using the set target rotation speed Ne* and rotation speed Nr (Nm2/Gr) of the ring gear shaft 32a and a gear ratio ρ of the power distribution and integration mechanism 30, and a torque command Tm1* of the motor MG1 is calculated by the following equation (2) on the basis of the calculated target rotation speed Nm1* and the present rotation speed Nm1 (step S140), and a torque command Tm2* of the motor MG2 is calculated by the following equation (3) by using the torque demand Tr*, the torque command Tm1*, the gear ratio ρ of the power distribution and integration mechanism 30, and the gear ratio Gr of the reduction gear 35 (step S150). Equation (1) is a mechanical relational expression for the rotating elements of the power distribution and integration mechanism 30. FIG. 6 shows an alignment chart of a mechanical relationship between the rotation speed and torque in the rotating elements of the power distribution and integration mechanism 30. In the figure, the left S axis indicates the rotation speed of the sun gear 31, which is the rotation speed Nm1 of the motor MG1, the C axis indicates the rotation speed of the carrier 34, which is the rotation speed Ne of the engine 22, and the R axis indicates the rotation speed Nr of the ring gear 32, which is obtained by dividing the rotation speed Nm2 of the motor MG2 by the gear ratio Gr of the reduction gear 35. The two heavy-line arrows on the R axis indicate a torque Tm1 output from the motor MG1, which works on the ring gear shaft 32a, and a torque Tm2 output from the motor MG2, which works on the ring gear shaft 32a via the reduction gear 35. By using this alignment chart, Equations (1) and (3) can be easily derived. Equation (2) is a relational expression in feedback control for rotating the motor MG1 at the target rotation speed Nm1*. In Equation (2), the second term of the right side "k1" is a gain of a proportional term, and the third term of the right side "k2" is a gain of an integral term.

$$Nm1^* = Ne^* \cdot (1+\rho)/\rho - Nm2/(Gr \cdot \rho) \quad (1)$$

$$Tm1^* = \text{Previous } Tm1^* + k1(Nm1^* - Nm1) + k2\int(Nm1^* - Nm1)dt \quad (2)$$

$$Tm2^* = (Tr^* + Tm1^*/\rho)/Gr \quad (3)$$

When the target rotation speed Ne* and the target torque Te* of the engine 22, and the torque commands Tm1*, Tm2* of the motors MG1 and MG2 have been set in this manner, the target rotation speed Ne* and the target torque Te* of the engine 22 are transmitted to the engine ECU 24, and the torque commands Tm1*, Tm2* of the motors MG1 and MG2 are transmitted to the motor ECU 40 (step S160), whereby the drive and control routine is finished. The engine ECU 24 that has received the target rotation speed Ne* and the target torque Te* performs control, such as throttle opening control, fuel injection control and ignition control in the engine 22, so that the engine 22 is operated at the drive point indicated by the target rotation speed Ne* and the target torque Te*. The motor ECU 40 that has received the torque commands Tm1*, Tm2* performs the switching control of the switching elements of the inverters 41, 42 so that the motor MG1 is driven on the torque command Tm1* and the motor MG2 is driven on the torque command Tm2*. The action of the engine 22 will later be described in detail.

When it has been judged at step S120 that the fuel reduction condition holds, a fuel reduction command is transmitted to the engine ECU 24 (step S170), and the value 0 is set in the torque command Tm1* of the motor MG1 (step S180). And in the same way as at step S150 above, the torque command Tm2* of the motor MG2 is set (step S150) and the set torque commands Tm1*, Tm2* are transmitted to the motor ECU 40 (step S160), whereby the drive and control routine is finished.

Figure 7:
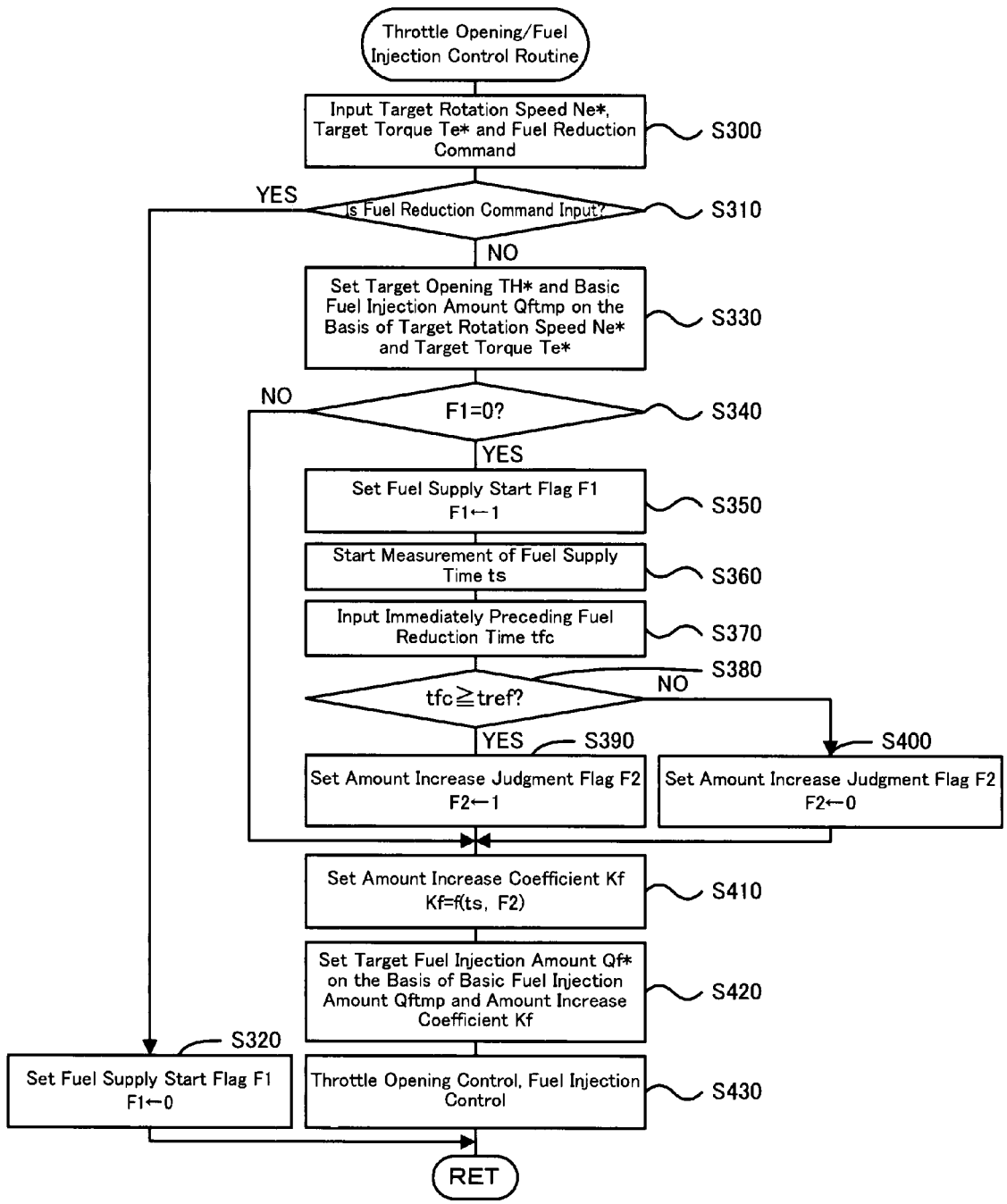
FIG. 7 is a flowchart showing an example of a throttle opening/fuel injection control routine executed by an engine ECU 24.

Next, the operation of the engine 22, particularly, throttle opening control, fuel injection control and ignition control will be described. In the following, for convenience of description, throttle opening control and fuel injection control will be first described and ignition control will be described thereafter. FIG. 7 is a flowchart showing an example of a throttle opening/fuel injection control routine executed by the engine ECU 24. This routine is executed when the engine ECU 24 has received either the target rotation speed Ne* and target torque Te* transmitted from the hybrid electronic control unit 70 or the fuel reduction command.

At the start of the execution of the throttle opening/fuel injection control routine, the CPU 24a of the engine ECU 24 first executes the processing for inputting data necessary for control, such as the target rotation speed Ne* and the target torque Te* of the engine 22, and the fuel reduction command (step S300) In this connection, the target rotation speed Ne*, the target torque Te* and the fuel reduction command are those set by the hybrid electronic control unit 70, that is, the target rotation speed Ne* and the target torque Te* are to be input by use of communication when the fuel reduction condition does not hold, and the fuel reduction command is to be input by use of communication when the fuel reduction condition holds.

When the data has been input like this, a judgment is made as to whether the input data is the fuel reduction command or the target rotation speed Ne* and the target torque Te* (step S310). When it is judged that the data is the fuel reduction command, the value 0 is set in a fuel supply start flag F1 (step S320), whereby the throttle opening/fuel injection control routine is finished. In this case, fuel supply to the engine 22 is not performed. In this connection, the fuel supply start flag F1 is such that the value 0 is set as an initial value or when a fuel reduction is performed, and the value 1 is set when fuel supply is started.

When it has been judged that the input data is the target rotation speed Ne* and the target torque Te* of the engine 22 (step S310), a target opening TH* of the throttle valve 124 and a basic fuel injection amount Qftmp are set on the basis of the target rotation speed Ne* and the target torque Te* of the engine 22 (step S330). In this embodiment, the target opening TH* and the basic fuel injection amount Qftmp at which the engine 22 can be operated with good efficiency at a drive point consisting of the target rotation speed Ne* and the target torque Te* are fixed beforehand by an experiment or the like on the basis of the target rotation speed Ne* and the target torque Te* and stored in the ROM 24b as an unillustrated map and this setting of the target opening TH* and the basic fuel injection amount Qftmp is performed by deriving a corresponding target opening TH* and basic fuel injection amount Qftmp from the stored map when the target rotation speed Ne* and the target torque Te* are given.

Subsequently, the value of the fuel supply start flag F1 is examined (step S340). This processing is intended for making a judgment as to whether or not this is the timing to start fuel supply by stopping the state in which a fuel reduction is performed. When the value of the fuel supply start flag F1 is 0, the value 1 is set in the fuel supply start flag F1 (step S350) and the measurement of a fuel supply time ts for which fuel supply is being performed (step S360). And an immediately preceding fuel reduction time tfc as a duration from the start of the fuel reduction of the engine 22 to the start of fuel supply is input (step S370), and a judgment is made as to whether or not the input immediately preceding fuel reduction time tfc is a prescribed time tref or longer (step S380). In this connection, when a fuel reduction has not been performed since "ignition on", the value 0 is set as the immediately preceding reduction time tfc. The prescribed time tref is a time used to judge whether or not the operating state of the engine 22 can come to a lean state in performing fuel supply in order to operate the engine 22, and is defined by the characteristics of the engine 22 and the like. It is possible to use 0.8 second, 1 second and 2 seconds, for example, as the prescribed time tref. In starting fuel supply in order to operate the engine 22 after a fuel reduction for a certain duration, in a case where the fuel supply is started in order to output some torque from the engine 22, the operating state of the engine 22 becomes apt to come to a lean state unless an amount increase of fuel is performed. When the operating state of the engine 22 has come to a lean state in this manner, knocking becomes apt to occur. In this case, therefore, it is desirable to perform an amount increase of fuel so that the operating state of the engine 22 does not come to a lean state as far as possible. On the other hand, when the fuel reduction time is relatively short, it is desirable not to perform an amount increase of fuel in consideration of a low possibility that the operating state of the engine 22 will come to a lean state and the suppression of the worsening of fuel consumption. Therefore, the comparison between the immediately preceding fuel reduction time tfc and the prescribed time tref at step S380 becomes processing for judging whether or not an amount increase of fuel should be performed. When the immediately preceding fuel reduction time tfc is not less than the prescribed time tref, it is judged that an amount increase of fuel should be performed, and the value 1 is set in an amount increase judgment flag F2 indicating whether or not an amount increase of fuel should be performed (step S390). On the other hand, when the immediately preceding fuel reduction time tfc is less than the prescribed time tref, it is judged that it is unnecessary to perform an amount increase of fuel, and the value 0 is set in the amount increase judgment flag F2 (step S400). When the value 1 has been set in the fuel supply start flag F1 at step S350, if this routine is executed next time and beyond, the value of the fuel supply start flag F1 is 1 at step S340 and the flow of processing proceeds to the processing at step S410 without the execution of the processing at steps S350 to S400.

Figure 8:
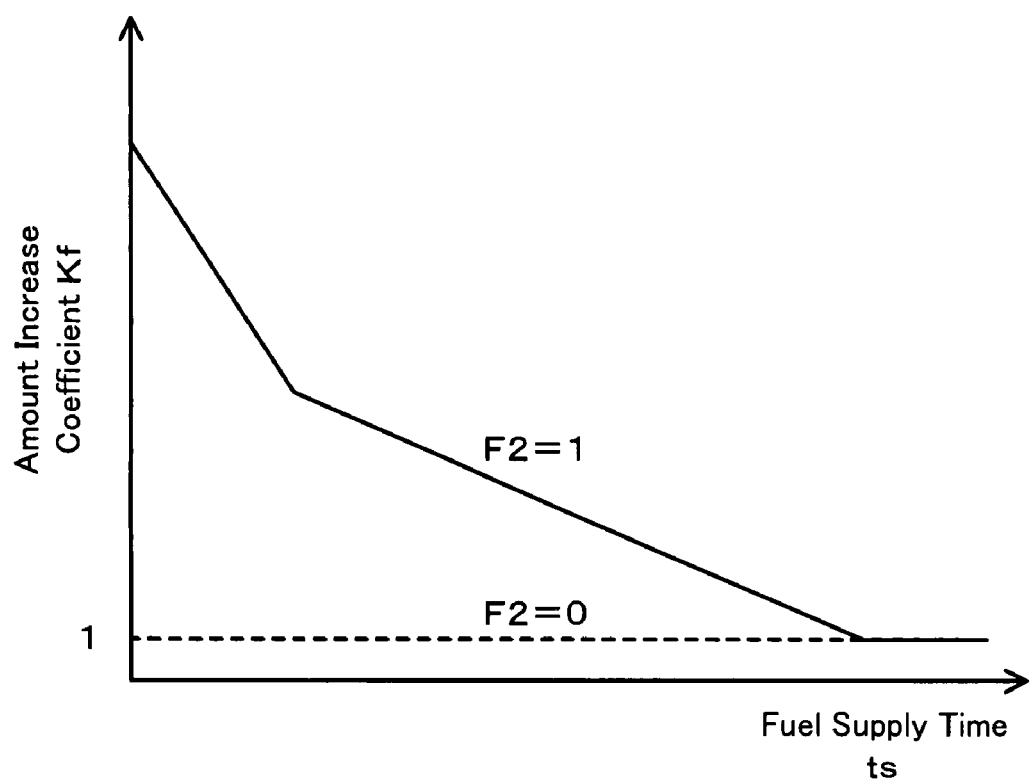
FIG. 8 is an explanatory diagram showing an example of an amount increase coefficient setting map.

Next, an amount increase coefficient Kf is set on the basis of the fuel supply time ts and the amount increase judgment flag F2 (step S410), and a target fuel injection amount Qf* is set on the basis of a product of the basic fuel injection amount Qftmp and the amount increase coefficient Kf (step S420). The amount increase coefficient Kf is a coefficient indicating the degree of an amount increase of fuel. In the embodiment, a relationship between the fuel supply time ts and the amount increase coefficient Kf is determined beforehand and stored in the ROM 24b as an amount increase coefficient setting map and a corresponding amount increase coefficient Kf is derived from the stored map when the fuel supply time ts is given, whereby the amount increase coefficient Kf is set. The amount increase coefficient setting map is shown in FIG. 8. As shown in the figure, when the value of the amount increase judgment flag F2 is 0, the value 1 is set in the amount increase coefficient Kf regardless of the fuel supply time ts. On the other hand, this amount increase coefficient Kf is set in such a manner that when the value of the amount increase judgment flag F2 is 1, the amount increase coefficient Kf tends to decrease toward the value 1 from values larger than the value 1 (for example, the value 1.3, the value 1.5 and the value 1.7) as the fuel supply time ts increases. This is based on the following reasons. For one reason, in starting fuel supply from the state of a fuel reduction, the operating state of the engine 22 tends to come to a lean state unless an amount increase of fuel is performed and, therefore, it is necessary to make the degree of an amount increase of fuel relatively large in order to suppress this. For the other reason, when fuel supply has been continued for a certain duration, the possibility that the operating state of the engine 22 would come to a lean state is low even if an amount increase of fuel is not performed so much and, therefore, it is desirable to reduce the degree of an amount increase in order to suppress the worsening of fuel consumption. Unless a correction coefficient other than the amount increase coefficient Kf is considered for the sake of simplicity, by setting the target fuel injection amount Qf* by use of the amount increase coefficient Kf thus set, the basic fuel injection amount Qftmp will be set as the target fuel injection amount Qf* when the value of the amount increase judgment flag F2 is 0, and a product of the basic fuel injection amount Qftmp and the amount increase coefficient Kf will be set as the target fuel injection amount Qf* when the value of the amount increase judgment flag F2 is 1. As described above, it is possible to more appropriately set the target fuel injection amount Qf* by setting the target fuel injection amount Qf* by use of the amount increase coefficient Kf according to the fuel supply time ts when the value of the amount increase judgment flag F2 is 1.

When the target throttle opening TH* and the target fuel injection amount Qf* are set in this manner, a drive signal is output to the throttle motor 136 so that the opening of the throttle valve 124 becomes the target opening TH* and a drive signal is output to the fuel injection valve 126 so that fuel injection is performed for a time corresponding to the target fuel injection amount Qf* (step S430), whereby the throttle opening/fuel injection control routine is finished.

Figure 9:
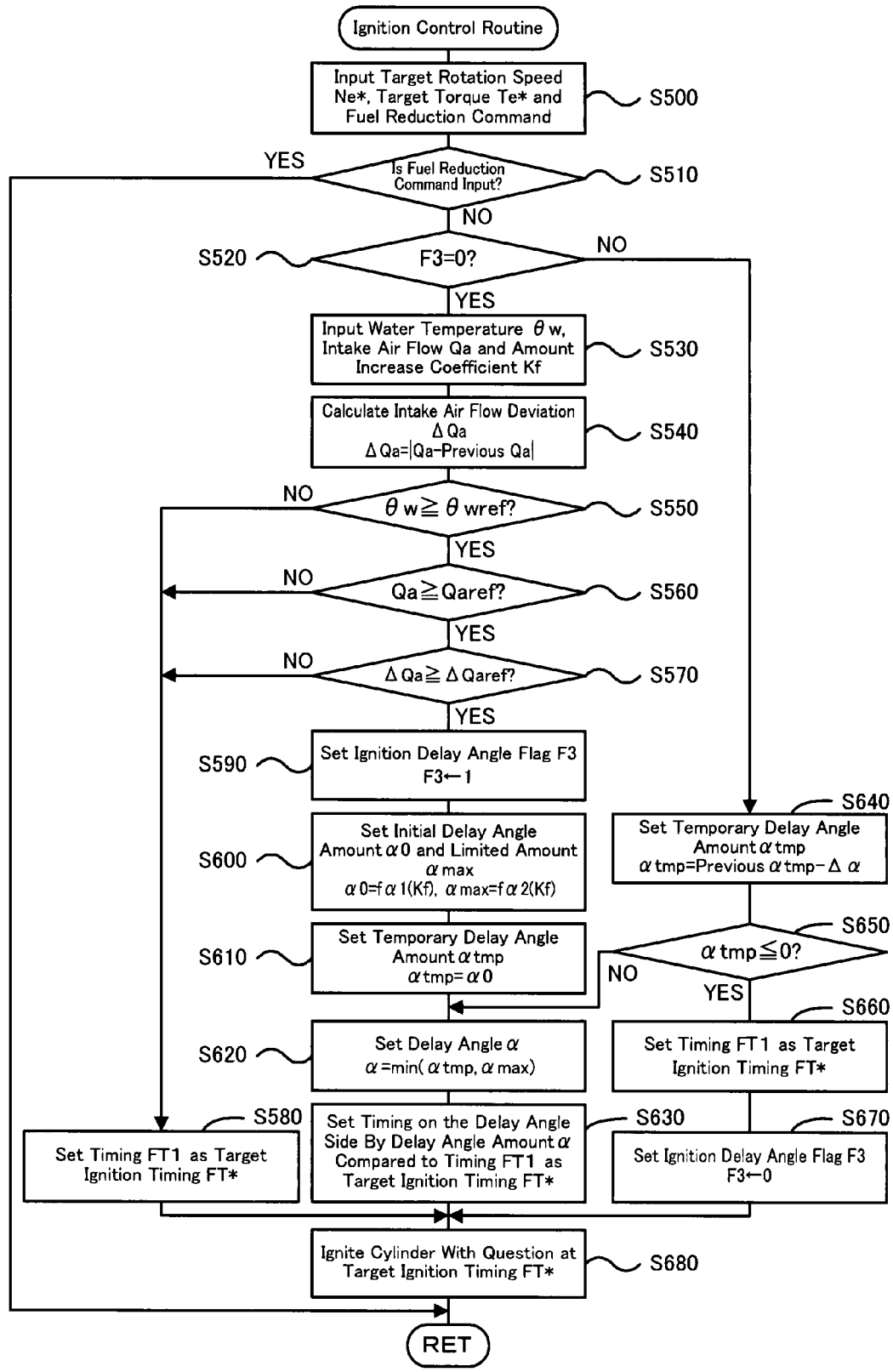
FIG. 9 is a flowchart showing an example of an ignition control routine executed by the engine ECU 24.

Next, ignition control will be described. FIG. 9 is a flowchart showing an example of an ignition control routine executed by the engine ECU 24. This routine is repeatedly executed. At the start of the execution of the ignition control routine, in the same way as the processing of step S100 of the above-described throttle opening/fuel injection control routine of FIG. 7, the CPU 24a of the engine ECU 24 first inputs either the target rotation speed Ne* and the target torque Te* of the engine 22 or the fuel reduction command, whichever has been transmitted from the hybrid electronic control unit 70 (step S500), and a judgment is made as to whether or not the input data is the fuel reduction command or the target rotation speed Ne* and the target torque Te* (step S510). When it has been judged that the data is the fuel reduction command, the ignition control routine is finished. On the other hand, when the input data is the target rotation speed Ne* and the target torque Te*, the value of an ignition delay angle flag F3, which will be described later, is examined (step S520) The ignition delay angle flag F3 is a flag for which the value 0 is set as an initial value and the value 1 is set when the ignition timing is delayed compared to the timing when the engine 22 is operated with good efficiency (timing FT1, which will be described later).

When the value of the ignition delay angle flag F3 is 0, data necessary for control, such as a cooling water temperature $\theta w$ from the water temperature sensor 142, an intake air flow Qa from the air flow meter 148 and the amount increase coefficient Kf, is input (step S530) and an intake air flow deviation $\Delta Qa$ is calculated as a deviation between the intake air flow Qa that has been input this time and the intake air flow (previous Qa) input previous time when this routine was executed (step S540). In this connection, the amount increase coefficient Kf is input by reading the data set by the throttle opening/fuel injection control routine of FIG. 7 and written in a prescribed address of RAM 24c.

The cooling water temperature $\theta w$ is compared with a threshold value $\theta wref$ (step S550), the intake air flow Qa is compared with a threshold value Qaref (step S560), and the intake air flow deviation $\Delta Qa$ is compared with a threshold value $\Delta Qaref$ (step S570). Now a case where the accelerator pedal 83 is greatly pressed by the driver is considered. At this time, in the drive and control routine of FIG. 3, the power demand Pe* changes rapidly in association with a rapid increase in the torque demand Tr* and, therefore, the target rotation speed Ne* and the target torque Te* of the engine 22 change rapidly. Therefore, if throttle opening control, fuel injection control, ignition control and the like are performed by the engine ECU 24 to respond to this rapid change, the operating state of the engine 22 changes rapidly and tends to come to a lean state, with the result that knocking sometimes occurs. In addition, it can be thought that this knocking becomes more apt to occur when a cooling water temperature Tw is high to some extent and when the intake air flow Qa is relatively large. On the other hand, if the accelerator pedal 83 that has been greatly pressed is thereafter maintained in this state, the target rotation speed Ne* and the target torque Te* of the engine 22 become substantially constant and, therefore, the engine 22 is operated in a substantially steady state, with the result that the possibility of the occurrence of knocking becomes low. The processing at steps S550 to S570 becomes processing for judging whether or not a condition under which the operating state of the engine 22 may cause knocking in association with its rapid change has held (this condition is hereinafter referred to as a condition for predicting the occurrence of transient knocking). The threshold value $\theta wref$, the threshold value Qaref and the threshold value $\Delta Qaref$ are those used to judge whether or not the condition for predicting the occurrence of transient knocking has held, and is defined by the characteristics of the engine 22 and the like. For example, 70° C., 80° C., 90° C. and the like can be set as the threshold value $\theta wref$, and air flows corresponding to 60%, 70%, 80% and the like of a maximum intake air flow Qamax capable of being taken into the engine 22 can be set as the intake air flow Qaref. Amounts of change corresponding to 3%, 5% and 10% of the intake air flow input when this routine was executed previous time (previous Qa) and amounts of change corresponding to 2%, 3% and 5% of the maximum intake air amount Qamax can be set as the threshold value $\Delta Qaref$.

When the cooling water temperature $\theta w$ is lower than the threshold value $\theta wref$, when the intake air flow Qa is smaller than the threshold value Qaref, and when the intake air flow deviation $\Delta Qa$ is smaller than the threshold value $\Delta Qaref$, it is judged that the condition for predicting the occurrence of transient knocking does not hold, the timing FT1 at which the engine 22 is operated with good efficiency is set as target ignition timing FT* (step S580), and a control signal is output to the ignition coil 138 so that the ignition of the cylinder in question is performed when the set target ignition timing FT* has been reached (step S670), whereby the ignition control routine is finished. Since this routine is repeatedly executed, in the case of a multiple-cylinder engine 22, it follows that when this routine is executed next time, ignition is performed with the target ignition timing FT* for a cylinder different from the cylinder for which ignition has been just performed (the next cylinder) Ignition is performed for each of the cylinders in this manner.

Figure 10:
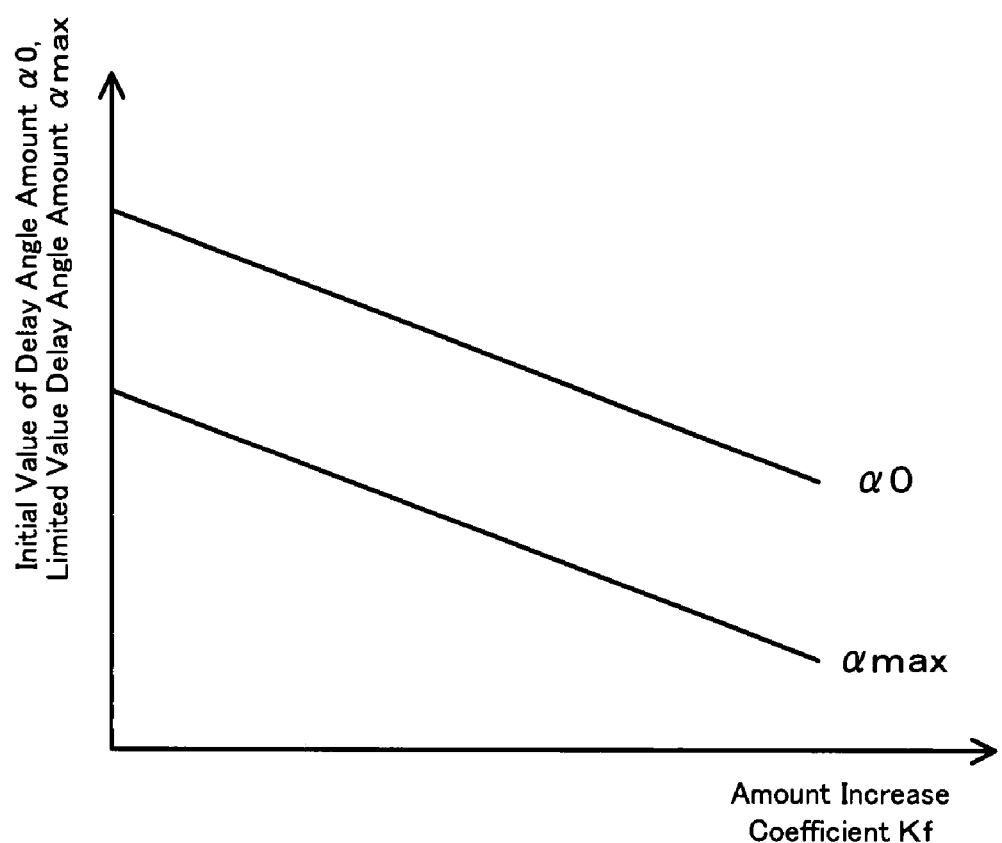
FIG. 10 is an explanatory diagram showing an example of a delay angle amount setting map.

When at steps S550 to S570, the cooling water temperature $\theta w$ is not less than the threshold value $\theta wref$ and the intake air flow Qa not less than the threshold value Qaref and the intake air flow deviation $\Delta Qa$ not less than the threshold value $\Delta Qaref$, it is judged that the condition for predicting the occurrence of transient knocking has held, and the value 1 is set in the ignition delay angle flag F3 (step S590). And an initial value $\alpha 0$ of the delay angle amount and a limited amount $\alpha max$ of the delay angle amount are set on the basis of the amount increase coefficient Kf input at step 530 (step S600), the set initial value $\alpha 0$ of the delay angle amount is set as a temporary delay angle amount $\alpha tmp$ (step S610), a delay angle amount $\alpha$ is set by limiting the set temporary delay angle amount $\alpha tmp$ by the limited amount $\alpha max$ of the delay angle amount (step S620), timing on the delay angle side by the delay angle amount $\alpha$ compared to the timing FT1 is set as the target ignition timing FT* (step S630), and the ignition of the cylinder in question is performed when the set target ignition timing FT* has been reached (step S680), whereby the ignition control routine is finished. The initial value $\alpha 0$ of the delay angle amount indicates the degree with which the ignition timing is delayed compared to the timing FT1 in order to suppress the occurrence of knocking when the knocking may occur. The limited amount $\alpha max$ of the delay angle amount indicates a delay angle amount occurring when the ignition timing is delayed compared to the timing FT1 in order to suppress the occurrence of knocking while suppressing the worsening of drivability, and in the embodiment, a value smaller than the initial value $\alpha 0$ of the delay angle amount is used as the limited amount $\alpha max$ of the delay angle amount. In this case, therefore, it follows that ignition is performed with the timing on the delay angle side by the limited amount $\alpha max$ of the delay angle amount compared to the timing FT1. The initial value $\alpha 0$ of the delay angle amount and the limited amount $\alpha max$ of the delay angle amount can be defined by the characteristics of the engine 22 and the like. In the embodiment, a relationship between the amount increase coefficient Kf and the initial value $\alpha 0$ of the delay angle amount and the limited amount $\alpha max$ of the delay angle amount is determined beforehand by an experiment and the like and stored as a delay angle amount setting map, and a corresponding initial value $\alpha 0$ of the delay angle amount and a corresponding limited amount $\alpha max$ of the delay angle amount are derived from the stored map when the amount increase coefficient Kf is given, whereby the initial value $\alpha 0$ of the delay angle amount and the limited amount $\alpha max$ of the delay angle amount are set. An example of the delay angle amount setting map is shown in FIG. 10. As shown in the figure, the initial value $\alpha 0$ of the delay angle amount and the limited amount $\alpha max$ of the delay angle amount are set in such a manner that as the amount increase coefficient Kf increases, these values tend to decrease. This is because it is thought that the larger the amount increase coefficient Kf, the lower the possibility that the operating state of the engine 22 comes to a lean state, with the result that it is possible to suppress the occurrence of knocking even when the degree with which the ignition timing is delayed compared to the timing FT1 is small. As described earlier, the limited value αmax of the delay angle amount is set so as to be smaller than the initial value α0 of the delay angle amount. By setting the initial value α0 of the delay angle amount and the limited amount αmax of the delay angle amount like this, also in the delay angle amount α, the larger the amount increase coefficient Kf, the smaller the degree with which the ignition timing is delayed. Therefore, it is possible to suppress the occurrence of knocking without delaying the ignition timing more than necessary. In addition, by suppressing the delaying of the ignition timing more than necessary when the amount increase coefficient Kf is large, that is, when an amount increase of fuel is performed and the operating state of the engine 22 becomes less apt to come to a lean state, it is possible to prevent a torque from the engine 22 from becoming too small and it is possible to suppress the worsening of drivability. Furthermore, by setting the target ignition timing FT* by use of the limited amount αmax of the delay angle amount, it is possible to suppress the delaying of the ignition timing more satisfactorily.

When the Value of the ignition delay angle flag F3 is the value 1 at step S520, the temporary delay angle amount αtmp is set by subtracting a prescribed value αΔ from the temporary delay angle amount αtmp set when this routine was executed previous time (previous αtmp) (step 640), and the set temporary delay angle amount αtmp is compared with the value 0 (step 650). When the temporary delay angle amount αtmp is larger than the value 0, the delay angle amount α is set by limiting the temporary delay angle amount αtmp by the limited amount αmax of the delay angle amount (step S620), the timing on the delay angle side by the delay angle amount α compared to the timing FT1 is set as the target ignition timing FT* (step S630), and the ignition of the cylinder in question is performed when the set target ignition timing FT* has been reached (step S680), whereby the ignition control routine is finished. The prescribed value Δα indicates the degree with which the temporary delay angle amount αtmp is reduced at each of the intervals of execution of this routine, and is defined by the characteristics of the engine 22 and the like. When this routine is repeatedly executed like this, the temporary delay angle amount αtmp decreases gradually each time ignition is performed. And when the temporary delay angle amount αtmp has become not more than the value 0 (step S650), the timing FT1 is set as the target ignition timing FT* (step S660) and the value 0 is set in the ignition delay angle flag F3 (step S670). When the set target ignition timing FT* has been reached, the ignition of the cylinder in question is performed (step S680), whereby the ignition control routine is finished.

Figure 11:
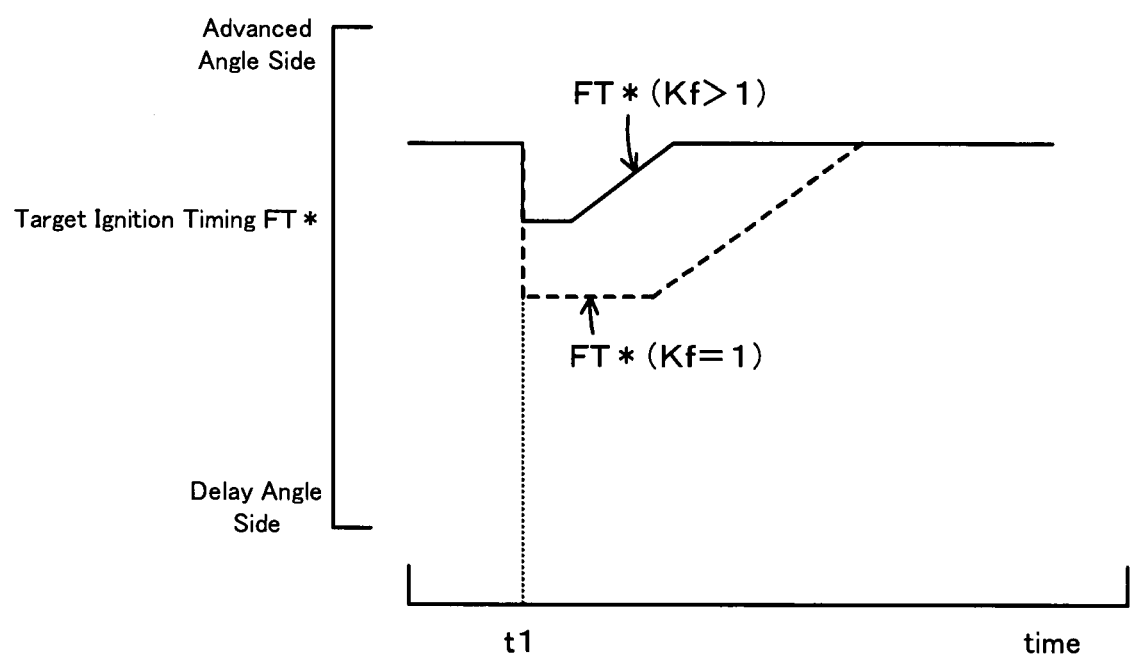
FIG. 11 is an explanatory diagram showing an example of the state of changes with time in target ignition timing FT*.

FIG. 11 is an explanatory diagram showing an example of the state of changes with time in the target ignition timing FT* of the engine 22. In the figure, the solid line indicates the state of a change with time in the target ignition timing FT* when the amount increase coefficient Kf is larger than the value 1, that is, when an amount increase of fuel is performed, and the broken line indicates the state of a change with time in the target ignition timing FT* when the amount increase coefficient Kf is the value 1. As shown in the figure, when the cooling water temperature θw is not less than the threshold value θwref and the intake air flow Qa not less than the threshold value Qaref and the intake air flow deviation ΔQa not less than the threshold value ΔQaref (timing t1), the delay angle amount with the target ignition timing FT* is reduced when an amount increase of fuel is performed (see the solid line in the figure) compared to the case where an amount increase of fuel is not performed (see the broken line in the figure). Because of this, it is possible to suppress the occurrence of knocking without delaying the ignition timing more than necessary. As a result of this, it is also possible to suppress the worsening of drivability.

According to the above-described hybrid vehicle 20 of the embodiment, when the condition for predicting the occurrence of transient knocking, which is a condition under which the operating state of the engine 22 may cause knocking in association with its rapid change, has held, ignition is performed with the timing on the delay angle side by the delay angle amount α compared to the timing FT1, the delay angle amount α having the tendency to decrease as the amount increase coefficient Kf increases. Therefore, it is possible to suppress the occurrence of knocking without delaying the ignition timing more than necessary. As a result of this, it is also possible to suppress the worsening of drivability. In addition, by setting the delay angle amount α by use of a limited amount β of the delay angle amount, it is possible to suppress the delaying of the ignition timing more satisfactorily.

In the hybrid vehicle 20 of the embodiment, a judgment is made as to whether or not the condition for predicting the occurrence of transient knocking has held by using the cooling water temperature θw, the intake air flow Qa and the intake air flow deviation ΔQa. However, it is also possible not to use one of the cooling water temperature θw and the intake air flow Qa or to use neither of the two. Furthermore, a judgment may be made as to whether or not the condition for predicting the occurrence of transient knocking has held by use of the rotation speed Ne of the engine 22, a torque Te output from the engine 22, variations in the rotation speed Ne and the torque Te and the like in place of or in addition to the cooling water temperature θw, the intake air flow Qa and the intake air flow deviation ΔQa. The torque Te output from the engine 22 can be calculated by using, for example, the torque demand Tm1* of the motor MG1 and the gear ratio ρ of the power distribution and integration mechanism 30.

In the hybrid vehicle 20 of the embodiment, as shown in the delay angle amount setting map of FIG. 10, the initial value α0 of the delay angle amount and the limited amount αmax of the delay angle amount are set in such a manner that as the amount increase coefficient Kf increases, these values tend to decrease linearly. However, the initial value α0 of the delay angle amount and the limited amount αmax of the delay angle amount may also be set in such a manner that these values tend to decrease in the manner of a curve in proportion. The initial value α0 of the delay angle amount and the limited amount αmax of the delay angle amount may also be set in such a manner that these values tend to decrease in proportion in stages consisting of one or more stages. Also, when the amount increase coefficient Kf is larger than a prescribed value K1 (for example, the value 1.1 and the value 1.2), the value 0 may be set in the initial value α0 of the delay angle amount and the limited amount αmax of the delay angle amount. In this case, ignition is performed with the timing FT1 when the amount increase coefficient Kf is larger than the prescribed value K1.

In the hybrid vehicle 20 of the embodiment, the ignition timing is delayed by the delay angle amount a compared to the timing FT1, the delay angle amount a having the tendency to decrease as the amount increase coefficient Kf increases. However, it is also possible to adopt such a manner that when the condition for predicting the occurrence of transient knocking had held, the ignition timing is delayed compared to the timing FT1 when an amount increase of fuel is not performed, whereas the ignition timing is not delayed compared to the timing FT1 when an amount increase of fuel is performed. In this case, it is possible to suppress the occurrence of knocking when an amount increase of fuel is not performed, and it is possible to prevent the torque output from the engine 22 from becoming small when an amount increase of fuel is performed. Since the operating state of the engine 22 is less apt to come to a lean state when an amount increase of fuel is performed than the case where an amount increase of fuel is not performed, it can be thought that the possibility of the occurrence of knocking is low compared to the case where an amount increase of fuel is not performed.

In the hybrid vehicle 20 of the embodiment, the delay angle amount $\alpha$ is set by using only the temporary delay angle amount $\alpha$tmp and the limited amount $\alpha$max of the delay angle amount. However, the delay angle amount $\alpha$ may also be set by using only the temporary delay angle amount $\alpha$tmp without using the limited amount $\alpha$max of the delay angle amount. In this case, it is also possible to perform processing for setting the temporary delay angle amount $\alpha$tmp as the delay angle amount $\alpha$ in place of the processing at step S620 of the ignition control routine of FIG. 9.

In the hybrid vehicle 20 of the embodiment, the value 1 is set in the amount increase judgment flag F2 when the immediately preceding fuel reduction time tfc is not less than the prescribed time tref. This method, however, is not restrictive in any sense, and the value 1 may also be set in the amount increase judgment flag F2, for example, when the temperature of a ternary catalyst of the purification device 134 has exceeded a prescribed temperature. In this case, a value larger than the value 1 may also be set in the amount increase coefficient Kf until the temperature of the ternary catalyst becomes the prescribed temperature or a temperature a little lower than the prescribed temperature in stead of setting the amount increase coefficient Kf in such a manner that the amount increase coefficient Kf tends to decrease from a value larger than the value 1 toward the value 1 over time.

In the hybrid vehicle 20 of the embodiment, in reducing the temporary delay angle amount $\alpha$tmp, the temporary delay angle amount $\alpha$tmp is reduced each time by the prescribed value $\Delta\alpha$. However, the use of this prescribed value $\Delta\alpha$ is not limited to a case where a fixed value is used, and setting may also be performed on the basis of the rotation speed Ne of the engine 22, the amount increase coefficient Kf and the like.

In the hybrid vehicle 20 of the embodiment, in reducing the temporary delay angle amount $\alpha$tmp, the temporary delay angle amount $\alpha$tmp is reduced each time ignition is performed. This method, however, is not restrictive in any sense, and the temporary delay angle amount $\alpha$tmp may also be reduced for each cycle of the engine 22 (each time the engine 22 rotates twice).

In the hybrid vehicle 20 of the embodiment, in the throttle opening/fuel injection control routine of FIG. 7, in performing the operation of the engine 22 after a fuel reduction, the value 1 is set as the amount increase coefficient Kf regardless of the fuel supply time ts when the immediately preceding fuel reduction time tfc is less than the prescribed time tref. However, in the same manner as when the immediately preceding fuel reduction time tfc is not less than the prescribed time tref, the setting of the amount increase coefficient Kf may be performed in such a manner that set values tend to decrease from values larger than the value 1 (for example, the value 1.3, the value 1.5 and the value 1.7) toward the value 1 as the fuel supply time ts becomes long.

Figure 12:
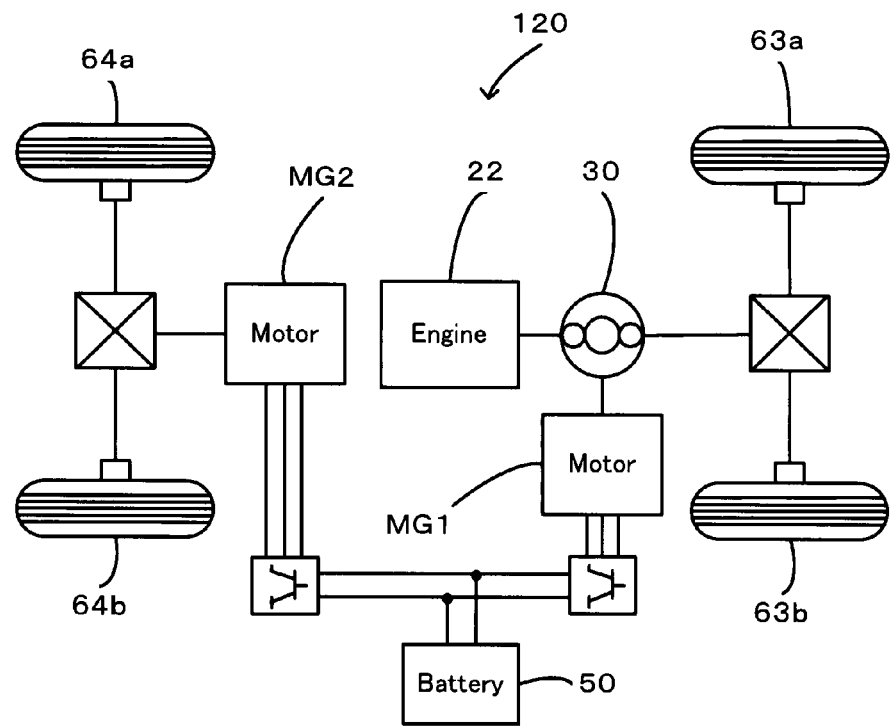
FIG. 12 is a block diagram showing a general configuration of a hybrid vehicle 120 in a modification.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 12, the power of the motor MG2 may be output to another axle (that is, an axle linked with wheels 64a and 64b), which is different from an axle connected with the ring gear shaft 32a (that is, an axle linked with the wheels 63a and 63b).

Figure 13:
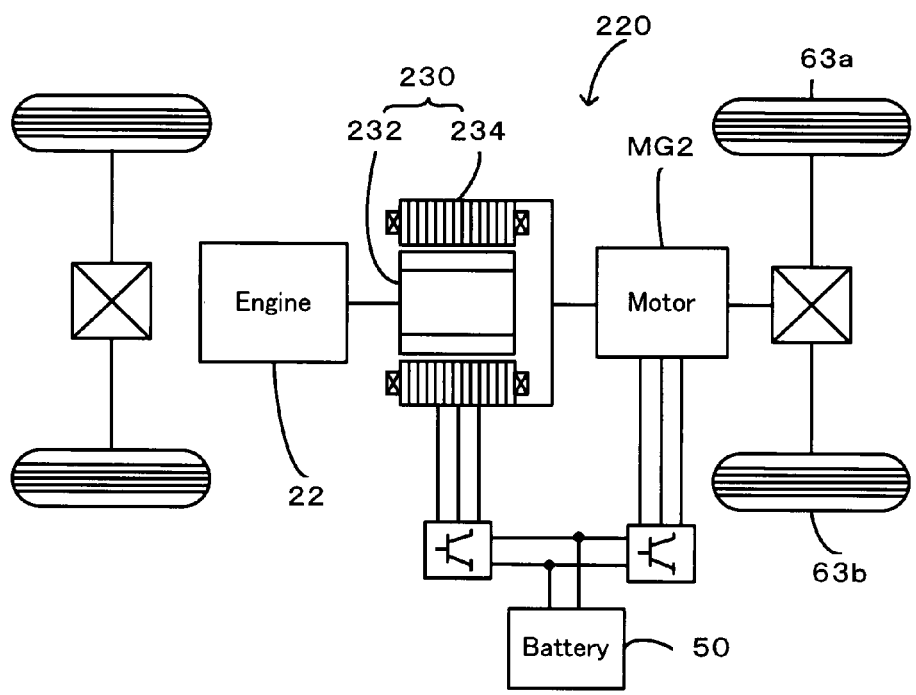
FIG. 13 is a block diagram showing a general configuration of a hybrid vehicle 220 in a modification.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 13, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

Now a description will be given of the corresponding relationship between the principal elements of the embodiment and modifications thereof and the principal elements of the present invention described in Summary of the Invention. In the embodiment and modifications thereof, the fuel injection valve 126 that injects gasoline corresponds to the "fuel injection device," the ignition plug 130 and the ignition coil 138 correspond to the "ignition device," the engine ECU 24 that executes the processing for setting the basic fuel injection amount Qftmp by using the target rotation speed Ne* and the target torque Te* of the engine 22, setting the amount increase coefficient Kf on the basis of the amount increase judgment flag F2 based on the immediately preceding fuel reduction time tfc and the fuel supply time ts, and setting the target fuel injection amount Qf* on the basis of a product of the basic fuel injection amount Qftmp and the amount increase coefficient Kf, corresponds to the "target fuel injection amount setting device," the engine ECU 24 that executes the processing for outputting a drive signal to the fuel injection valve 126 so that fuel injection for a fuel injection time corresponding to the set target fuel injection amount Qf* is performed, corresponds to the "fuel injection control device," the engine ECU 24 that executes the processing for setting, on the basis of the cooling water temperature $\theta$w, the intake air flow Qa and the intake air flow deviation $\Delta$Qa, the timing FT1 as the target ignition timing FT* when the condition for predicting the occurrence of transient knocking, under which the operating state of the engine 22 may cause knocking in association with its rapid change, does not hold, and setting, as the target ignition timing FT*, the timing on the delay angle side by the delay angle amount compared to the timing FT1, the delay angle amount having the tendency to decrease as the amount increase coefficient Kf increases when the condition for predicting the occurrence of transient knocking has held, corresponds to the "target ignition timing setting device," and the engine ECU 24 that executes the processing for outputting a control signal to the ignition coil 138 so that the ignition of the cylinder in question is performed when the set target ignition timing FT* has been reached, corresponds to the "ignition control device." The power distribution and integration mechanism 30, which is connected to the crankshaft 26 of the engine 22 and the ring gear shaft 32a as the drive shaft, and the motor MG1 that is connected to the power distribution and integration mechanism 30 correspond to the "rotation adjustment device," and the motor MG2 connected to the ring gear shaft 32a corresponds to the "electric motor." The corresponding relationship between the principal elements of the embodiment and modifications thereof and the principal elements of the present invention described in Summary of the Invention, does not limit the elements of the present invention described in Summary of the Invention, because the embodiment is an example to concretely describe the best mode for carrying out the present invention described in Summary of the Invention This is because the interpretation of the present invention described in Summary of the Invention should be performed on the basis of the descriptions given in Summary of the Invention, and because the embodiment is a concrete example of the present invention described in Summary of the Invention.

Since all equipment provided with an internal combustion engine apparatus can perform control similar to the ignition control routine in the above-described embodiment, the present invention may also be in the form of a power output apparatus and an internal combustion engine apparatus mounted on a moving body, such an automobile, a vehicle, a ship and an airplane, and also in the form of a power output apparatus and an internal combustion engine apparatus built in equipment that does not move, such as construction facilities. The present invention may also be in the form of a control method of such an internal combustion engine apparatus and a control method of such a power output apparatus.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The disclosure of Japanese Patent Application No. 2006-305031 filed on Nov. 10, 2006 including specification, drawings and claims are incorporated herein by reference in their entirety.

What is claimed is:

1. An internal combustion engine apparatus provided with an internal combustion engine, said internal combustion engine apparatus comprising:
a fuel injection device capable of injecting a fuel for each cylinder of said internal combustion engine;
an ignition device capable of ignition for each cylinder of said internal combustion engine;
a target fuel injection amount setting device that sets, as a target fuel injection amount, a fuel injection amount based on target power to be output from said internal combustion engine and a prescribed fuel restriction when a fuel amount increasing condition for an increase in the amount of a fuel supplied to said internal combustion engine does not hold, and sets, as said target fuel injection amount, a fuel injection amount that is increased by use of the degree of an amount increase based on a prescribed amount increase restriction with respect to a fuel injection amount based on said target power and said prescribed fuel restriction when said fuel amount increasing condition has held;
a fuel injection control device that controls said fuel injection device so that fuel injection is performed on the basis of said set target fuel injection amount;
a target ignition timing setting device that sets, as target ignition timing, timing based on a prescribed ignition restriction when a rapid-change condition, under which the operating state of said internal combustion engine comes to a prescribed rapid-change state, does not hold, and sets a delay angle amount within a range of a limit to said delay angle amount that is set to ensure that said delay angle amount decreases in proportion as the degree of an amount increase based on said prescribed amount increase restriction, and sets, as said target ignition timing, timing on the delay angle side by the set delay angle amount compared to the timing based on said prescribed ignition restriction when said rapid-change condition has held; and
an ignition control device that controls said ignition device so that ignition is performed with said set target ignition timing.

2. An internal combustion engine apparatus according to claim 1, wherein when said rapid-change condition has held and in a case where the degree of an amount increase based on said prescribed amount increase restriction is larger than the degree of a prescribed amount increase, said target ignition timing setting device is a device that sets, as said target ignition timing, timing based on said prescribed ignition restriction regardless of whether the rapid-change condition holds.

3. An internal combustion engine apparatus according to claim 1, wherein when said rapid-change condition has held, said target ignition timing setting device is a device that sets said delay angle amount so that the degree of an amount increase becomes smaller than when the degree of an amount increase is not more than the degree of a second prescribed amount increase in a case where the degree of an amount increase based on said prescribed amount increase restriction is larger than the degree of said second prescribed amount increase.

4. An internal combustion engine apparatus according to claim 3, wherein when said rapid-change condition has held, said target ignition timing setting device is a device that sets said delay angle amount within a range of a limit to a delay angle amount that is set to be smaller than when the degree of an amount increase is not more than the degree of the prescribed amount increase in a case where the degree of an amount increase based on said prescribed amount increase restriction is larger than the degree of said second prescribed amount increase.

5. An internal combustion engine apparatus according to claim 1, wherein said prescribed rapid-change state is a state in which an intake air flow of an intake air system of said internal combustion engine is not less than a prescribed air flow, and a rate of change of said intake air flow is not less than a prescribed rate of change, and a temperature of said internal combustion engine is not less than a prescribed temperature.

6. An internal combustion engine apparatus according to claim 1, wherein said fuel amount increasing condition is a condition that holds when fuel supply to said internal combustion engine is performed after the continuation of a stop of fuel supply to said internal combustion engine for a duration of not less than a prescribed time.

7. An internal combustion engine apparatus according to claim 1, wherein said prescribed amount increase restriction is a restriction such that said degree of an amount increase decreases with a lapse of time.

8. An internal combustion engine apparatus according to claim 1, wherein when said rapid-change condition has held, said target ignition timing setting device is a device that sets said target ignition timing so that said target ignition timing is approached from timing on the delay angle side compared to the timing based on said prescribed ignition restriction toward timing based on the prescribed ignition restriction.

9. A vehicle, comprising:
an internal combustion engine;
a fuel injection device capable of injecting a fuel for each cylinder of said internal combustion engine;
an ignition device capable of ignition for each cylinder of said internal combustion engine;
a rotation adjusting device that is connected to an output shaft of said internal combustion engine and to a drive shaft connected to an axle so as to be rotatable independently of the output shaft and can adjust a rotation speed of said output shaft with respect to said drive shaft, with input and output of electric power and input and output of a drive force to and from said output shaft and said drive shaft;

an electric motor capable of input and output of power to and from said drive shaft;

a target fuel injection amount setting device that sets, as a target fuel injection amount, a fuel injection amount based on target power to be output from said internal combustion engine and a prescribed fuel restriction when a fuel amount increasing condition for an increase in the amount of a fuel supplied to said internal combustion engine does not hold, and sets, as said target fuel injection amount, a fuel injection amount that is increased by use of the degree of an amount increase based on a prescribed amount increase restriction with respect to a fuel injection amount based on said target power and said prescribed fuel restriction when said fuel amount increasing condition has held;

a fuel injection control device that controls said fuel injection device so that fuel injection is performed on the basis of said set target fuel injection amount;

a target ignition timing setting device that sets, as target ignition timing, timing based on a prescribed ignition restriction when a rapid-change condition, under which the operating state of said internal combustion engine comes to a prescribed rapid-change state, does not hold, and sets a delay angle amount within a range of a limit to said delay angle amount that is set to ensure that said delay angle amount decreases in proportion as the degree of an amount increase based on said prescribed amount increase restriction, and sets, as said target ignition timing, timing on the delay angle side by the set delay angle amount compared to the timing based on said prescribed ignition restriction when said rapid-change condition has held; and an ignition control device that controls said ignition device so that ignition is performed with said set target ignition timing.

10. A control method of an internal combustion engine apparatus provided with a fuel injection device capable of injecting a fuel for each cylinder of the internal combustion engine and an ignition device capable of ignition for each cylinder of said internal combustion engine, said control method of an internal combustion engine apparatus, comprising:

setting, as a target fuel injection amount, a fuel injection amount based on target power to be output from said internal combustion engine and a prescribed fuel restriction and controlling said fuel injection device so that fuel injection is performed on the basis of said set target fuel injection amount when a fuel amount increasing condition for an increase in the amount of a fuel supplied to said internal combustion engine does not hold, while, setting, as said target fuel injection amount, a fuel injection amount that is increased by use of the degree of an amount increase based on a prescribed amount increase restriction with respect to a fuel injection amount based on said target power and said prescribed fuel restriction and controlling said fuel injection device so that fuel injection is performed on the basis of said set target fuel injection amount when said fuel amount increasing condition has held; and setting, as target ignition timing, timing based on a prescribed ignition restriction and controlling said ignition device so that ignition is performed with said set target ignition timing when a rapid-change condition under which the operating state of said internal combustion engine comes to a prescribed rapid-change state does not hold, while, setting a delay angle amount within a range of a limit to said delay angle amount that is set to ensure that said delay angle amount decreases in proportion as the degree of an amount increase based on said prescribed amount increase restriction, and setting, as said target ignition timing, timing on the delay angle side by the set delay angle amount compared to the timing based on said prescribed ignition restriction and controlling said ignition device so that ignition is performed with said set target ignition timing when said rapid-change condition has held.

11. An internal combustion engine apparatus according to claim 1, wherein said prescribed rapid-change state is a state in which a rate of change of an intake air flow of said internal combustion engine is not less than a prescribed rate change.

12. A drive device that outputs a drive force to a drive shaft, comprising:

an internal combustion engine;

a fuel injection device capable of injecting a fuel for each cylinder of said internal combustion engine;

an ignition device capable of ignition for each cylinder of said internal combustion engine;

a rotation adjusting device that is connected to an output shaft of said internal combustion engine and to said drive shaft so as to be rotatable independently of the output shaft and can adjust a rotation speed of said output shaft with respect to said drive shaft, with input and output of electric power and input and output of a drive force to and from said output shaft and said drive shaft;

an electric motor capable of input and output of power to and from said drive shaft;

a target fuel injection amount setting device that sets, as a target fuel injection amount, a fuel injection amount based on target power to be output from said internal combustion engine and a prescribed fuel restriction when a fuel amount increasing condition for an increase in the amount of a fuel supplied to said internal combustion engine does not hold, while, sets, as said target fuel injection amount, a fuel injection amount that is increased by use of the degree of an amount increase based on a prescribed amount increase restriction with respect to a fuel injection amount based on said target power and said prescribed fuel restriction and when said fuel amount increasing condition has held;

a fuel injection control device that controls said fuel injection device so that fuel injection is performed on the basis of said set target fuel injection amount;

a target ignition timing setting device that sets, as target ignition timing, timing based on a prescribed ignition restriction when a rapid-change condition, under which the operating state of said internal combustion engine comes to a prescribed rapid-change state, does not hold, and sets a delay angle amount within a range of a limit to the delay angle amount that is set to ensure that said delay angle amount decreases in proportion as the degree of an amount increase based on said prescribed amount increase restriction, and sets, as said target ignition timing, timing on the delay angle side by the set delay angle amount compared to the timing based on said prescribed ignition restriction when said rapid-change condition has held; and an ignition control device that controls said ignition device so that ignition is performed with said set target ignition timing.

13. A power output apparatus according to claim 12, wherein the above-described rotation adjusting device can also be a mechanism that is provided with a three-shaft type power input output module, which is connected to the three shafts of the output shaft of the above-described internal combustion engine, the above-described power output shaft and a third shaft, and inputs and outputs power to and from two of the three shafts on the basis of the power input and output to the remaining one shaft, and a generator capable of inputting and outputting power to and from the above-described third shaft.

* * * * *

UNITED STATES PATENT AND TRADEMARK OFFICE
CERTIFICATE OF CORRECTION

PATENT NO. : 7,845,333 B2
APPLICATION NO. : 11/979412
DATED : December 7, 2010
INVENTOR(S) : Hitoki Sugimoto Page 1 of 1

It is certified that error appears in the above-identified patent and that said Letters Patent is hereby corrected as shown below:

| Column | Line | |
|---|---|---|
| 23 | 24 | Change "α∆" to --∆α--. |
| 24 | 59 | Change "amount a" to --amount α--. |
| 24 | 60 | Change "amount a" to --amount α--. |
| 28 | 4 | Change "An internal" to --The internal--. |
| 28 | 13 | Change "An internal" to --The internal--. |
| 28 | 23 | Change "An internal" to --The internal--. |
| 28 | 34 | Change "An internal" to --The internal--. |
| 28 | 41 | Change "An internal" to --The internal--. |
| 28 | 47 | Change "An internal" to --The internal--. |
| 28 | 51 | Change "An internal" to --The internal--. |
| 30 | 16 | Change "An internal" to --The internal--. |
| 31 | 4 | Change "A power output apparatus" to --The drive device--. |
| 32 | 1 | After "above-described" delete "power". |

Signed and Sealed this
Fourteenth Day of June, 2011

David J. Kappos
*Director of the United States Patent and Trademark Office*